United States Patent
Hoshi

(10) Patent No.: US 10,854,900 B2
(45) Date of Patent: Dec. 1, 2020

(54) FUEL CELL SYSTEM AND CONTROL METHOD FOR FUEL CELL SYSTEM

(71) Applicant: NISSAN MOTOR CO., LTD., Yokohama (JP)

(72) Inventor: Kiyoshi Hoshi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 21 days.

(21) Appl. No.: 15/117,956

(22) PCT Filed: Dec. 17, 2014

(86) PCT No.: PCT/JP2014/083350
§ 371 (c)(1),
(2) Date: Aug. 10, 2016

(87) PCT Pub. No.: WO2015/122097
PCT Pub. Date: Aug. 20, 2015

(65) Prior Publication Data
US 2016/0351928 A1    Dec. 1, 2016

(30) Foreign Application Priority Data

Feb. 17, 2014 (JP) .................................. 2014-027808
Feb. 17, 2014 (JP) .................................. 2014-027809

(51) Int. Cl.
*H01M 8/04828* (2016.01)
*H01M 8/04858* (2016.01)
(Continued)

(52) U.S. Cl.
CPC ......... *H01M 8/04925* (2013.01); *B60L 58/31* (2019.02); *B60L 58/34* (2019.02);
(Continued)

(58) Field of Classification Search
CPC ....... H01M 16/006; H01M 2008/1095; H01M 2250/20; H01M 2250/402;
(Continued)

(56) References Cited

U.S. PATENT DOCUMENTS

2007/0212580 A1    9/2007   Seo et al.
2015/0280262 A1   10/2015   Hoshi

FOREIGN PATENT DOCUMENTS

JP      07-249423 A    9/1995
JP    2000-357526 A   12/2000
(Continued)

OTHER PUBLICATIONS

Machine Translation JP2013027246(A) (Year: 2013).*

*Primary Examiner* — Victoria H Lynch
(74) *Attorney, Agent, or Firm* — Foley & Lardner LLP

(57) ABSTRACT

A fuel cell system is configured to generate power by supplying anode gas and cathode gas to a fuel cell. The fuel cell system includes a load connected to the fuel cell and an IV estimation unit configured to change an output current of the fuel cell with a predetermined width by adjusting power supplied to the load during the warm-up of the fuel cell. The fuel cell system is configured to estimate an IV characteristic of the fuel cell on the basis of at least two sets of an output current value and an output voltage value detected while the output current is changed. The fuel cell system includes an IV estimation stop unit configured to stop the execution of the IV estimation on the basis of an output of the fuel cell during the execution of the IV estimation.

3 Claims, 20 Drawing Sheets

(51) Int. Cl.
*H01M 8/04223* (2016.01)
*H01M 8/04537* (2016.01)
*H01M 8/04992* (2016.01)
*H01M 8/04955* (2016.01)
*B60L 58/34* (2019.01)
*B60L 58/31* (2019.01)
*H01M 8/1018* (2016.01)
*H01M 8/0438* (2016.01)
*H01M 16/00* (2006.01)
*H01M 8/0432* (2016.01)

(52) U.S. Cl.
CPC ....... *H01M 8/0488* (2013.01); *H01M 8/0491* (2013.01); *H01M 8/04268* (2013.01); *H01M 8/04552* (2013.01); *H01M 8/04559* (2013.01); *H01M 8/04582* (2013.01); *H01M 8/04589* (2013.01); *H01M 8/04873* (2013.01); *H01M 8/04902* (2013.01); *H01M 8/04955* (2013.01); *H01M 8/04992* (2013.01); *H01M 8/04358* (2013.01); *H01M 8/04388* (2013.01); *H01M 8/04395* (2013.01); *H01M 8/04649* (2013.01); *H01M 16/006* (2013.01); *H01M 2008/1095* (2013.01); *H01M 2250/20* (2013.01); *H01M 2250/402* (2013.01); *Y02B 90/10* (2013.01); *Y02T 90/40* (2013.01)

(58) Field of Classification Search
CPC ......... H01M 8/04268; H01M 8/04358; H01M 8/04388; H01M 8/04395; H01M 8/04552; H01M 8/04559; H01M 8/04582; H01M 8/04589
See application file for complete search history.

(56) References Cited

FOREIGN PATENT DOCUMENTS

| | | |
|---|---|---|
| JP | 2006-202643 A | 8/2006 |
| JP | 2006-244966 A | 9/2006 |
| JP | 2007-123077 A | 5/2007 |
| JP | 2007-141717 A | 6/2007 |
| JP | 2007-244179 A | 9/2007 |
| JP | 2008-021492 A | 1/2008 |
| JP | 2009-070574 A | 4/2009 |
| JP | 2012-059586 A | 3/2012 |
| JP | 2013-027246 A | 2/2013 |
| JP | 2013-131449 A | 7/2013 |
| WO | WO-2014/054560 A1 | 4/2014 |

* cited by examiner

FUEL CELL SYSTEM AND CONTROL METHOD FOR FUEL CELL SYSTEM

TECHNICAL FIELD

The present invention relates to a fuel cell system and a control method for fuel cell system.

Some fuel cell systems cause an output current of a fuel cell to vary and estimate an IV characteristic on the basis of an output current value and an output voltage value at that time (see JP2000-357526A).

SUMMARY OF INVENTION

After the start-up of a fuel cell system, a fuel cell is warmed up by self-heat generation by supplying generated power of the fuel cell to a load and a vehicle travel permit is issued, for example, after an IV characteristic of the fuel cell reaches a desired IV characteristic. Thus, it is being studied to issue the vehicle travel permit as early as possible by estimating the IV characteristic of the fuel cell during warm-up and issuing the vehicle travel permit when the estimated IV characteristic reaches the desired IV characteristic.

Here, to ensure the estimation accuracy of the IV characteristic, it is necessary to change an output current of the fuel cell with a specified current width or larger and estimate the IV characteristic on the basis of an output current value and an output voltage value at that time.

However, when the output current of the fuel cell is changed during warm-up, there may be cases where a current width necessary for the estimation of the IV characteristic cannot be ensured and a generation characteristic of the fuel cell itself is deteriorated.

The present invention was developed in view of such a problem and aims at providing a fuel cell system and a control method for fuel cell system which avoid the deterioration of an estimated power generation characteristic due to a change of an output current of a fuel cell.

According to one aspect of the present invention, a fuel cell system is configured to generate power by supplying anode gas and cathode gas to a fuel cell. The fuel cell system includes a load connected to the fuel cell and an IV estimation unit configured to change an output current of the fuel cell with a predetermined width by adjusting power supplied to the load during the warm-up of the fuel cell. The fuel cell system is configured to estimate an IV characteristic of the fuel cell on the basis of at least two sets of an output current value and an output voltage value detected while the output current is changed. The fuel cell system includes a IV estimation stop unit configured to stop the execution of the IV estimation on the basis of an output of the fuel cell during the execution of the IV estimation.

DESCRIPTION OF EMBODIMENT

Hereinafter, embodiments of the present invention are described with reference to the drawings.

In a fuel cell, an electrolyte membrane is sandwiched by an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both anode and cathode electrodes are as follows.

Anode electrode: $2H_2 \rightarrow 4H^+ + 4e^-$     (1)

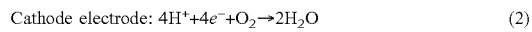

Cathode electrode: $4H^+ + 4e^- + O_2 \rightarrow 2H_2O$     (2)

The fuel cell generates an electromotive force of about 1 volt by these electrode reactions (1) and (2).

Figure 1:
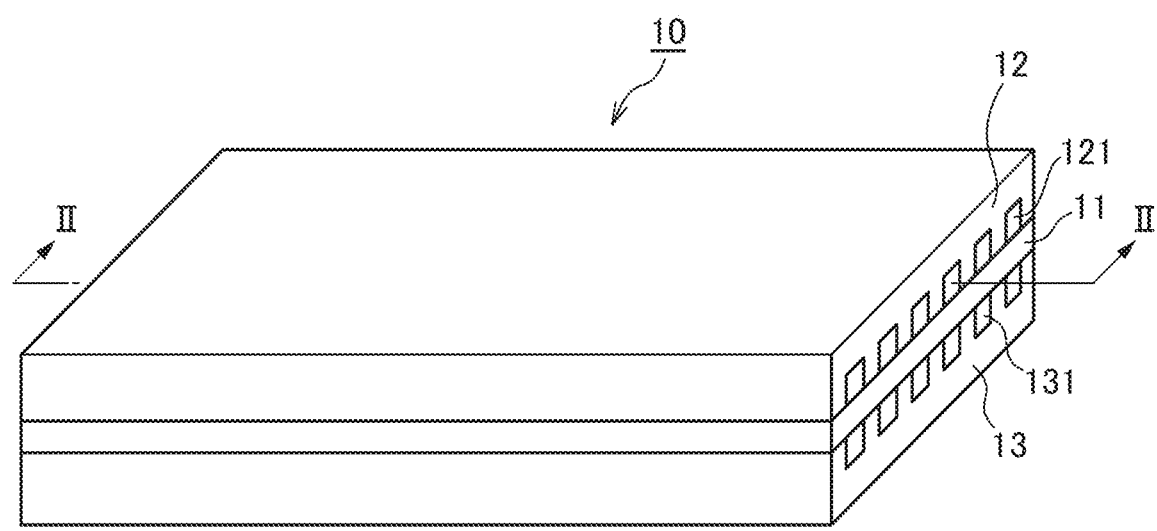
FIG. 1 is a diagram showing the configuration of a fuel cell according to a first embodiment of the present invention.
Figure 2:
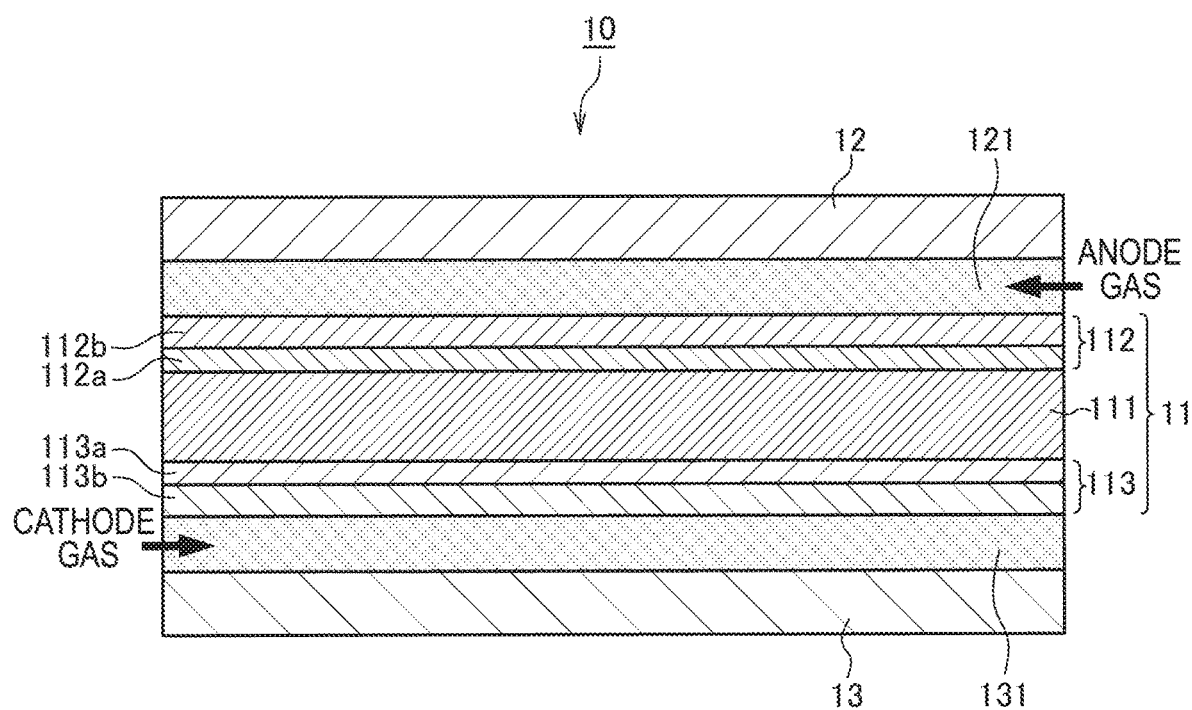
FIG. 2 is a sectional view along II-II of the fuel cell of FIG. 1.

FIGS. 1 and 2 are views showing the configuration of a fuel cell 10 according to one embodiment of the present invention. FIG. 1 is a schematic perspective view of the fuel cell 10. FIG. 2 is a sectional view along II-II of the fuel cell 10 of FIG. 1.

The fuel cell 10 is configured by arranging an anode separator 12 and a cathode separator 13 on both sides of an MEA 11.

The MEA 11 includes an electrolyte membrane 111, an anode electrode 112 and a cathode electrode 113. The MEA 11 includes the anode electrode 112 on one surface of the electrolyte membrane 111 and the cathode electrode 113 on the other surface.

The electrolyte membrane 111 is a proton conductive ion exchange membrane formed of fluororesin. The electrolyte membrane 111 exhibits good electrical conductivity in a wet state.

The anode electrode 112 includes a catalyst layer 112a and a gas diffusion layer 112b. The catalyst layer 112a is in contact with the electrolyte membrane 111. The catalyst layer 112a is formed of platinum or carbon black particles carrying platinum or the like. The gas diffusion layer 112b is provided on the outer side (side opposite to the electrolyte membrane 111) of the catalyst layer 112a and in contact with the anode separator 12. The gas diffusion layer 112b is formed of a member having sufficient gas diffusion property and electrical conductivity and, for example, formed of carbon cloth woven of threads made of carbon fiber.

As with the anode electrode 112, the cathode electrode 113 also includes a catalyst layer 113a and a gas diffusion layer 113b.

The anode separator 12 is in contact with the gas diffusion layer 112b. The anode separator 12 includes a plurality of groove-like anode gas flow passages 121 for supplying anode gas to the anode electrode 112.

The cathode separator 13 is in contact with the gas diffusion layer 113b. The cathode separator 13 includes a plurality of groove-like cathode gas flow passages 131 for supplying cathode gas to the cathode electrode 113.

The anode gas flowing in the anode gas flow passages 121 and the cathode gas flowing in the cathode gas flow passages 131 flow in opposite directions in parallel with each other. These gases may flow in the same direction in parallel with each other.

In the case of using such a fuel cell 10 as a power source for an automotive vehicle, a fuel cell stack 1 in which several hundreds of fuel cells are laminated is used since required power is large. Power for driving the vehicle is taken out by configuring a fuel cell system 100 for supplying anode gas and cathode gas to the fuel cell stack 1.

First Embodiment

Figure 3:
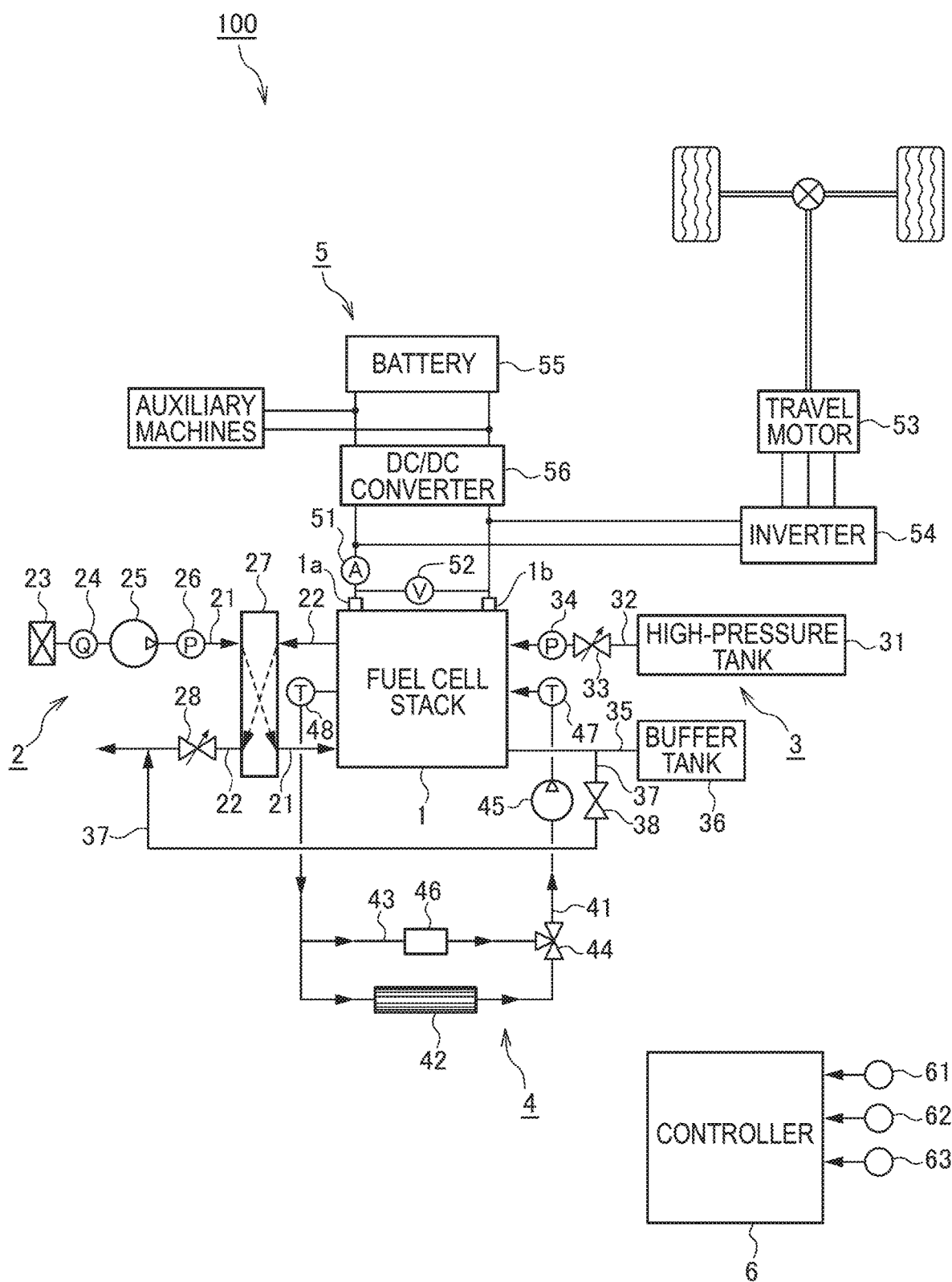
FIG. 3 is a schematic diagram of a fuel cell system according to the first embodiment.

FIG. 3 is a schematic diagram of the fuel cell system 100 according to a first embodiment of the present invention.

The fuel cell system 100 includes the fuel cell stack 1, a cathode gas supplying/discharging device 2, an anode gas supplying/discharging device 3, a stack cooling device 4, a power system 5 and a controller 6.

The fuel cell stack 1 is formed by laminating a plurality of fuel cells 10 and generates power necessary to drive a vehicle upon receiving the supply of the anode gas and the cathode gas. The fuel cell stack 1 includes an anode electrode side output terminal 1a and a cathode electrode side output terminal 1b as terminals for taking out power.

The cathode gas supplying/discharging device 2 includes a cathode gas supply passage 21, a cathode gas discharge passage 22, a filter 23, an air flow sensor 24, a cathode compressor 25, a cathode pressure sensor 26, a water recovery device (hereinafter, referred to as a "WRD") 27 and a cathode pressure regulating valve 28. The cathode gas supplying/discharging device 2 supplies the cathode gas to the fuel cell stack 1 and discharges cathode off-gas discharged from the fuel cell stack 1 to outside.

The cathode gas supply passage 21 is a passage in which the cathode gas to be supplied to the fuel cell stack 1 flows. One end of the cathode gas supply passage 21 is connected to the filter 23 and the other end is connected to a cathode gas inlet hole of the fuel cell stack 1.

The cathode gas discharge passage 22 is a passage in which the cathode off-gas discharged from the fuel cell stack 1 flows. One end of the cathode gas discharge passage 22 is connected to a cathode gas outlet hole of the fuel cell stack 1 and the other end is an opening end. The cathode off-gas is mixture gas of the cathode gas and steam produced by the electrode reaction.

The filter 23 removes foreign substances in the cathode gas to be taken into the cathode gas supply passage 21.

The air flow sensor 24 is provided upstream of the cathode compressor 25 in the cathode gas supply passage 21. The air flow sensor 24 detects a flow rate of the cathode gas to be supplied to the cathode compressor 25 and finally supplied to the fuel cell stack 1 (hereinafter, referred to as a "stack supply flow rate"). It should be noted that a detection value of this air flow sensor 24 is referred to as a "detected stack supply flow rate" below if necessary.

The cathode compressor 25 is provided in the cathode gas supply passage 21. The cathode compressor 25 takes air (outside air) as the cathode gas into the cathode gas supply passage 21 via the filter 23 and supplies it to the fuel cell stack 1.

The cathode pressure sensor 26 is provided between the cathode compressor 25 and the WRD 27 in the cathode gas supply passage 21. The cathode pressure sensor 26 detects a pressure of the cathode gas (hereinafter, referred to as a "cathode pressure") to be supplied to the fuel cell stack 1. It should be noted that a detection value of this cathode pressure sensor 26 is referred to as a "detected cathode pressure" below if necessary.

The WRD 27 is connected to each of the cathode gas supply passage 21 and the cathode gas discharge passage 22, recovers moisture in the cathode off-gas flowing in the cathode gas discharge passage 22 and humidifies the cathode gas flowing in the cathode gas supply passage 21 with that recovered moisture.

The cathode pressure regulating valve 28 is provided downstream of the WRD 27 in the cathode gas discharge passage 22. The cathode pressure regulating valve 28 is controlled to open and close by the controller 6 and adjusts the pressure of the cathode gas to be supplied to the fuel cell stack 1 to a desired pressure. It should be noted that a throttle such as an orifice may be provided without providing the cathode pressure regulating valve 28.

The anode gas supplying/discharging device 3 supplies the anode gas to the fuel cell stack 1 and discharges anode off-gas discharged from the fuel cell stack 1 to the cathode gas discharge passage 22. The anode gas supplying/discharging device 3 includes a high-pressure tank 31, an anode gas supply passage 32, an anode pressure regulating valve 33, an anode pressure sensor 34, an anode gas discharge passage 35, a buffer tank 36, a purge passage 37 and a purge valve 38.

The high-pressure tank 31 stores the anode gas (hydrogen) to be supplied to the fuel cell stack 1 in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31 and the other end is connected to an anode gas inlet hole of the fuel cell stack 1.

The anode pressure regulating valve 33 is provided in the anode gas supply passage 32. The anode pressure regulating valve 33 is controlled to open and close by the controller 6 to adjust a pressure of the anode gas to be supplied to the fuel cell stack 1 to a desired pressure.

The anode pressure sensor 34 is provided downstream of the anode pressure regulating valve 33 in the anode gas supply passage 32 and detects a pressure of the anode gas (hereinafter, referred to as an "anode pressure") to be supplied to the fuel cell stack 1. In the present embodiment, this anode pressure is used as a pressure in an anode system from the fuel cell stack 1 to the buffer tank 36. A detection value of this anode pressure sensor 34 is referred to as a "detected anode pressure" below if necessary.

One end of the anode gas discharge passage 35 is connected to an anode gas outlet hole of the fuel cell stack 1 and the other end is connected to the buffer tank 36. Mixture gas of excess anode gas not used in the electrode reaction and inert gas containing nitrogen and moisture (produced water and stream) and permeated from the cathode gas flow passages 131 to the anode gas flow passages 121 (hereinafter, referred to as "anode off-gas") is discharged to the anode gas discharge passage 35.

The buffer tank 36 temporarily stores the anode off-gas flowing from the anode gas discharge passage 35. The anode off-gas pooled in the buffer tank 36 is discharged to the cathode gas discharge passage 22 through the purge passage 37 when the purge valve 38 is open.

One end of the purge passage 37 is connected to the anode gas discharge passage 35 and the other end is connected to the cathode gas discharge passage 22.

The purge valve 38 is provided in the purge passage 37. The purge valve 38 is controlled to open and close by the controller 6 and controls a flow rate of the anode off-gas discharged from the anode gas discharge passage 35 to the cathode gas discharge passage 22 (hereinafter, referred to as a "bypass flow rate"). In the following description, the discharge of the anode off-gas to the cathode gas discharge passage 22 by opening the purge valve 38 is referred to as "purging" if necessary.

The anode off-gas discharged to the cathode gas discharge passage 22 via the anode gas discharge passage 35 is mixed with the cathode off-gas in the cathode gas discharge passage 22 and is discharged to the outside of the fuel cell system 100. Since the anode off-gas contains excess hydrogen not used in the electrode reaction, a hydrogen concentration in discharged gas is set to be equal to or lower than a predetermined specific concentration by mixing the anode off-gas with the cathode off-gas and discharging the mixture gas to the outside of the fuel cell system 100.

The stack cooling device 4 is a device for cooling the fuel cell stack 1 and keeping the fuel cell stack 1 at a temperature suitable for power generation. The stack cooling device 4 includes a cooling water circulation passage 41, a radiator 42, a bypass passage 43, a three-way valve 44, a circulation pump 45, a PTC heater 46, an inlet water temperature sensor 47 and an outlet water temperature sensor 48.

The cooling water circulation passage 41 is a passage in which cooling water for cooling the fuel cell stack 1 is circulated, and one end is connected to a cooling water inlet hole of the fuel cell stack 1 and the other end is connected to a cooling water outlet hole of the fuel cell stack 1.

The radiator 42 is provided in the cooling water circulation passage 41. The radiator 42 cools the cooling water discharged from the fuel cell stack 1.

One end of the bypass passage 43 is connected to the cooling water circulation passage 41 and the other end is connected to the three-way valve 44 so that the cooling water can be circulated while bypassing the radiator 42.

The three-way valve 44 is provided downstream of the radiator 42 in the cooling water circulation passage 41. The three-way valve 44 switches a circulation route of the cooling water according to the temperature of the cooling water. Specifically, when the temperature of the cooling water is higher than a predetermined temperature, the circulation route of the cooling water is so switched that the cooling water discharged from the fuel cell stack 1 is supplied to the fuel cell stack 1 again via the radiator 42. Conversely, when the temperature of the cooling water is lower than the predetermined temperature, the circulation route of the cooling water is so switched that the cooling water discharged from the fuel cell stack 1 is supplied to the fuel cell stack 1 again after flowing along the bypass passage 43 without via the radiator 42.

The circulation pump 45 is provided downstream of the three-way valve 44 in the cooling water circulation passage 41 and circulates the cooling water.

The PTC heater 46 is provided in the bypass passage 43. The PTC heater 46 is energized during the warm-up of the fuel cell stack 1 to increase the temperature of the cooling water.

The inlet water temperature sensor 47 is provided near the cooling water inlet hole of the fuel cell stack 1 in the cooling water circulation passage. The inlet water temperature sensor 47 detects the temperature of the cooling water flowing into the fuel cell stack 1 (hereinafter, referred to as an "inlet water temperature").

The outlet water temperature sensor 48 is provided near the cooling water outlet hole of the fuel cell stack 1 in the cooling water circulation passage. The outlet water temperature sensor 48 detects the temperature of the cooling water discharged from the fuel cell stack 1 (hereinafter, referred to as an "outlet water temperature").

In the present embodiment, an average water temperature of the inlet water temperature and the outlet water temperature is used as a temperature in the fuel cell stack 1 (hereinafter, referred to as a "stack temperature").

The power system 5 includes a current sensor 51, a voltage sensor 52, a travel motor 53, an inverter 54, a battery 55 and a DC/DC converter 56.

The current sensor 51 detects a current extracted from the fuel cell stack 1 (hereinafter, referred to as an "output current").

The voltage sensor 52 detects an inter-terminal voltage between the anode electrode side output terminal 1$a$ and the cathode electrode side output terminal 1$b$ (hereinafter, referred to as an "output voltage"). The voltage sensor 52 detects a voltage of each fuel cell 10 constituting the fuel cell stack 1 (hereinafter, referred to as a "cell voltage") and detects a total voltage of the fuel cells 10 as the output voltage. It should be noted that a voltage of each group composed of a plurality of the fuel cells 10 (cell group voltage) may be detected.

The travel motor 53 is a three-phase alternating-current synchronous motor in which a permanent magnet is embedded in a rotor and a stator coil is wound around a stator. The travel motor 53 has a function as a motor to be rotationally driven upon receiving the supply of power from the fuel cell stack 1 and the battery 55 and a function as a generator for generating electromotive forces on opposite ends of the stator coil during the deceleration of the vehicle in which the rotor is rotated by an external force.

The inverter 54 is composed of a plurality of semiconductor switches such as IGBTs (Insulated Gate Bipolar Transistors). The semiconductor switches of the inverter 54 are controlled to open and close by the controller 6, thereby converting direct-current power into alternating-current power or alternating-current power into direct-current power. The inverter 54 converts composite direct-current power of generated power of the fuel cell stack 1 and output power of the battery 55 into three-phase alternating-current power and supplies it to the travel motor 53 when the travel motor 53 functions as the motor. On the other hand, the inverter 54 converts regenerative power (three-phase alternating-current power) of the travel motor 53 into direct-current power and supplies it to the battery 55 when the travel motor 53 functions as the generator.

The battery 55 is charged with a surplus of the generated power (output current×output voltage) of the fuel cell stack 1 and the regenerative power of the travel motor 53. The power charged into the battery 55 is supplied to auxiliary machines such as the cathode compressor 25 and the travel motor 53 if necessary.

The DC/DC converter 56 is a bidirectional voltage converter for increasing and decreasing the output voltage of the fuel cell stack 1. By controlling the output voltage of the fuel cell stack 1 by the DC/DC converter 56, the output current of the fuel cell stack 1 and, consequently, the generated power are controlled.

The controller 6 is configured by a microcomputer including a central processing unit (CPU), a read-only memory (ROM), a random access memory (RAM) and an input/output interface (I/O interface).

To the controller 6 are input signals from various sensors for detecting an operating state of the fuel cell system 100 such as an accelerator stroke sensor 61 for detecting a depressed amount of an accelerator pedal (hereinafter, referred to as an "accelerator operation amount"), an SOC sensor 62 for detecting a charge amount of the battery 55 and a battery temperature sensor 63 for detecting the temperature of the battery 55 besides the air flow sensor 24 and the like described above.

The controller 6 calculates a target output current of the fuel cell stack 1 on the basis of the operating state of the fuel cell system 100. Specifically, the target output current is calculated on the basis of power required by the travel motor 53, power required by the auxiliary machines such as the cathode compressor 25, charge/discharge requests of the battery 55 and a warm-up request. Then, the controller 6 controls the output voltage of the fuel cell stack 1 by the DC/DC converter 56 so that the output current of the fuel cell stack 1 can reach the target output current.

Further, the controller 6 controls the cathode compressor 25, the circulation pump 45 and the like so that the electrolyte membranes 111 can have a degree of wetness (water content) suitable for power generation. Specifically, an internal impedance (High Frequency Resistance; hereinafter, referred to as "HFR") of the fuel cell stack 1 correlated with the degree of wetness of the electrode membranes 111 is calculated, for example, by an alternating-current impedance method or the like. Then, the cathode compressor 25, the circulation pump 45 and the like are controlled so that the HFR can reach a target HFR. The smaller the HFR, the higher the degree of wetness of the electrolyte membranes 111. It should be noted that the target HFR is set at a predetermined value suitable for power generation determined in advance by an experiment or the like.

Figure 4:
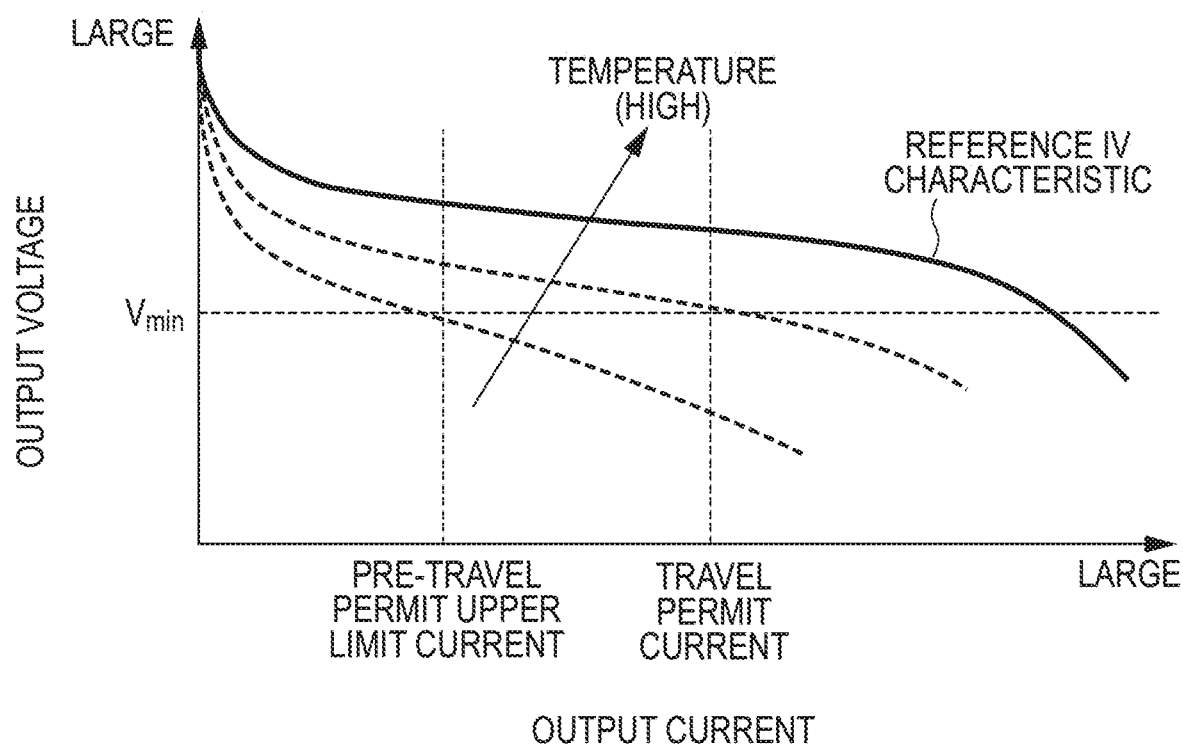
FIG. 4 is a graph showing a relationship between the temperature and an IV characteristic of a fuel cell stack.

FIG. 4 is a graph showing a relationship between the temperature of the fuel cell stack 1 and a current-voltage characteristic (hereinafter, referred to as an "IV characteristic") of the fuel cell stack 1. In FIG. 4, an IV characteristic shown by solid line is an IV characteristic after the warm-up of the fuel cell stack 1 is completed (hereinafter, referred to as a "reference IV characteristic").

As shown in FIG. 4, the IV characteristic of the fuel cell stack 1 changes according to the temperature of the fuel cell stack 1 and the output voltage when the output current of the same value is extracted from fuel cells becomes lower as the temperature of the fuel cell stack 1 decreases. Specifically, the power generation efficiency of the fuel cell stack 1 is reduced as the temperature of the fuel cell stack 1 decreases.

If the travel of the vehicle is permitted in a state where the power generation efficiency of the fuel cell stack 1 is low, power required by the travel motor 53 during travel increases and the output voltage of the fuel cell stack 1 may drop below a system minimum voltage $V_{min}$ when the output current of the fuel cell stack 1 increases. Here, the system minimum voltage $V_{min}$ is a voltage value which is set by an experiment or the like in advance and at which the drive of the travel motor 53 is obstructed if the output voltage of the fuel cell stack 1 drops below the system minimum voltage $V_{min}$. In the present embodiment, when the output voltage drops below the system minimum voltage $V_{min}$, the controller 6 stops the operation of the fuel cell system 100 as a fail-safe. Specifically, the controller 6 constitutes system stop unit that stops the fuel cell system 100 when the output voltage of the fuel cell stack 1 drops to or below the system minimum voltage $V_{min}$ (second predetermined value).

Accordingly, after the start-up of the fuel cell stack 100, a vehicle travel permit needs to be issued after confirming that the IV characteristic changing from moment to moment according to a temperature increase of the fuel cell stack 1 has reached an IV characteristic in which the output voltage of the fuel cell stack 1 does not drop below the system minimum voltage $V_{min}$ even if the travel motor 53 is driven, while the fuel cell stack 1 is warmed up. In FIG. 4, the vehicle travel permit needs to be issued after confirming that an IV characteristic in which the output voltage when the output current of the fuel cell stack 1 reaches a travel permit current does not drop below the system minimum voltage $V_{min}$ has been reached. The travel permit current is a value obtained by adding a predetermined margin to a minimum value of the output current at which the vehicle can start or travel smoothly by driving the travel motor 53, and set by an experiment or the like in advance.

However, out of electrical components (loads) connected to the fuel cell stack 1, electrical components energizable during warm-up in which no travel permit is issued are limited to the auxiliary machines other than the travel motor 53 such as the cathode compressor 25 and the PTC heater 46 and the battery 55. That is, an output current not less than a current which can be caused to flow into the auxiliary machines and the battery 55 cannot be extracted from the fuel cell stack 1 during warm-up in which no travel permit is issued.

Accordingly, an upper limit value of the output current during warm-up in which no travel permit is issued (hereinafter, referred to as a "pre-travel permit upper limit current") is the sum of a current which can flow into the auxiliary machines (hereinafter, referred to as an "auxiliary machine consumption current") and a current which can flow into the battery 55. This pre-travel permit upper limit current is a value smaller than the travel permit current.

Thus, since the travel permit current cannot be extracted from the fuel cell stack 1 during warm-up in which no travel permit is issued, it is not possible to actually determine whether or not the output voltage when the travel permit current is extracted from the fuel cell stack 1 is below the system minimum voltage $V_{min}$.

Accordingly, in the present embodiment, after the start-up of the fuel cell system 100, the IV characteristic of the fuel cell stack 1 is estimated while the fuel cell stack 1 is warmed up and the vehicle travel permit is issued when the estimated IV characteristic reaches the predetermined IV characteristic in which the output voltage of the fuel cell stack 1 does not drop below the system minimum voltage $V_{min}$ even if the travel motor 53 is driven.

Figure 5:
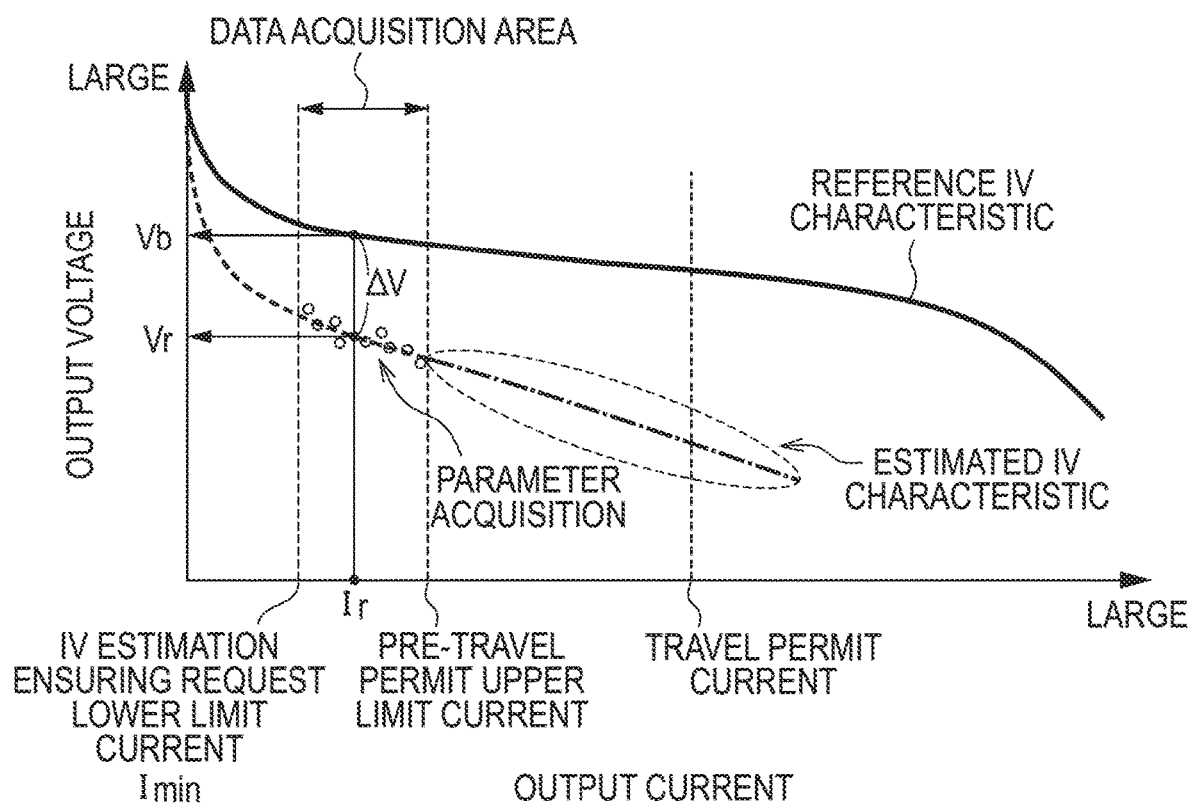
FIG. 5 is a graph showing a method for estimating the IV characteristic of the fuel cell stack during the start-up of the fuel cell system.

FIG. 5 is a graph showing a method for estimating the IV characteristic of the fuel cell stack 1 during the start-up of the fuel cell system 100. In FIG. 5, a solid line represents a reference IV characteristic. A broken line represents an actual IV characteristic at a certain point during warm-up in which no travel permit is issued (hereinafter, referred to as an "actual IV characteristic").

During warm-up in which no travel permit is issued, the output current can be increased only to the pre-travel permit upper limit current. Thus, the actual IV characteristic in an area not less than the pre-travel permit upper limit current cannot be actually detected.

Here, it is empirically proven that a relationship of an actual output current Ir at a certain point during warm-up in which no travel permit is issued and a voltage difference $\Delta V$ between a reference voltage Vb at that time (voltage supposed to be actually detected when the IV characteristic is the reference IV characteristic) and an actual output voltage Vr can be approximated by a linear function as shown in the following equation (3).

$$\Delta V = A \times Ir + B \quad (3)$$

Accordingly, if reference voltages Vb1, Vb2 and actual output voltages Vr1, Vr2 corresponding to actual output currents Ir1, Ir2 at least at arbitrary two points are respectively calculated by varying the output current to the pre-travel permit upper limit current, a gradient A and an intercept B of equation (3) can be calculated. As a result, an output voltage at an arbitrary output current in the area not less than the pre-travel permit upper limit current can be calculated on the basis of equation (3), wherefore the actual IV characteristic in the area not less the pre-travel permit upper limit current can be estimated as shown by dashed-dotted line in FIG. 5.

It should be noted that since a voltage drop due to activation polarization is large and a variation of the output voltage in response to a variation of the output current is relatively large until the output current reaches an IV estimation accuracy ensuring request lower limit current $I_{min}$ as shown in FIG. 5, approximation accuracy is reduced. That is, the relationship of the actual output current Ir and the voltage difference $\Delta V$ cannot be approximated by a linear function until the output current reaches the IV estimation accuracy ensuring request lower limit current $I_{min}$. Thus, in this embodiment, by varying the output current with a specified variation width or larger for a section from the IV estimation accuracy ensuring request lower limit current $I_{min}$ to the pre-travel permit upper limit current (hereinafter, referred to as a "data acquisition area"), a plurality of each of the above three parameters (actual output current, reference voltage and actual output voltage) are acquired and the gradient A and the intercept B of equation (3) are calculated by a minimum square method. It should be noted that the output current is varied with the specified variation width or larger since estimation accuracy is more improved as the number of the acquired parameters increases.

There are considered a method for acquiring data while increasing the output current and a method for acquiring data while reducing the output current in the case of varying the output current in the data acquisition area and acquiring data on the reference voltages and the actual output voltages at that time. Since the IV characteristic is gradually recovered during warm-up, the estimated IV characteristic tends to be an IV characteristic closer to the reference IV characteristic than to the actual IV characteristic if the coefficient A and the intercept B of equation (3) are calculated on the basis of the parameters acquired while increasing the output current. If a travel permit is issued on the basis of such an estimated IV characteristic, there is a possibility that the output voltage drops below the minimum voltage when the output current is increased to the travel permit current. Thus, in the present embodiment, the IV characteristic is estimated on the basis of the parameters acquired while reducing the output current.

As just described, the output current needs to be varied with the specified variation width or larger from the IV estimation accuracy ensuring request lower limit current $I_{min}$ to the pre-travel permit upper limit current in order to accurately estimate the IV characteristic during warm-up in which no travel permit is issued.

Here, during warm-up, the auxiliary machine consumption current is made as large as possible to promote the warm-up of the fuel cell stack 1 by self-heat generation. Thus, when the output current is varied in estimating the IV characteristic, it is desired to be avoided, if possible, that the output current drops below this auxiliary machine consumption current for warm-up. Accordingly, in the present embodiment, when the output current is varied in estimating the IV characteristic, data necessary for IV estimation is acquired basically by reducing the output current after the output current is increased to an output current for IV characteristic estimation larger than the auxiliary machine consumption current.

However, since the IV characteristic has not yet reached the reference IV characteristic and power generation is unstable during warm-up, the output voltage may largely drop if the output current is further increased from the auxiliary machine consumption current set to be large for warm-up. As a result, the output voltage may drop below the system minimum voltage $V_{min}$. Further, the output voltage of the fuel cell stack 1 may drop below a predetermined minimum voltage necessary in operating the fuel cell system 100 and the fuel cell system 100 may have to be stopped.

Accordingly, in the present embodiment, if the output voltage drops to or below a predetermined voltage $V_1$ higher than the system minimum voltage $V_{min}$ when the output current is increased to estimate the IV characteristic, the output current is temporarily returned to the auxiliary machine consumption current and increased again to estimate the IV characteristic after the elapse of a predetermined time.

Figure 6A:
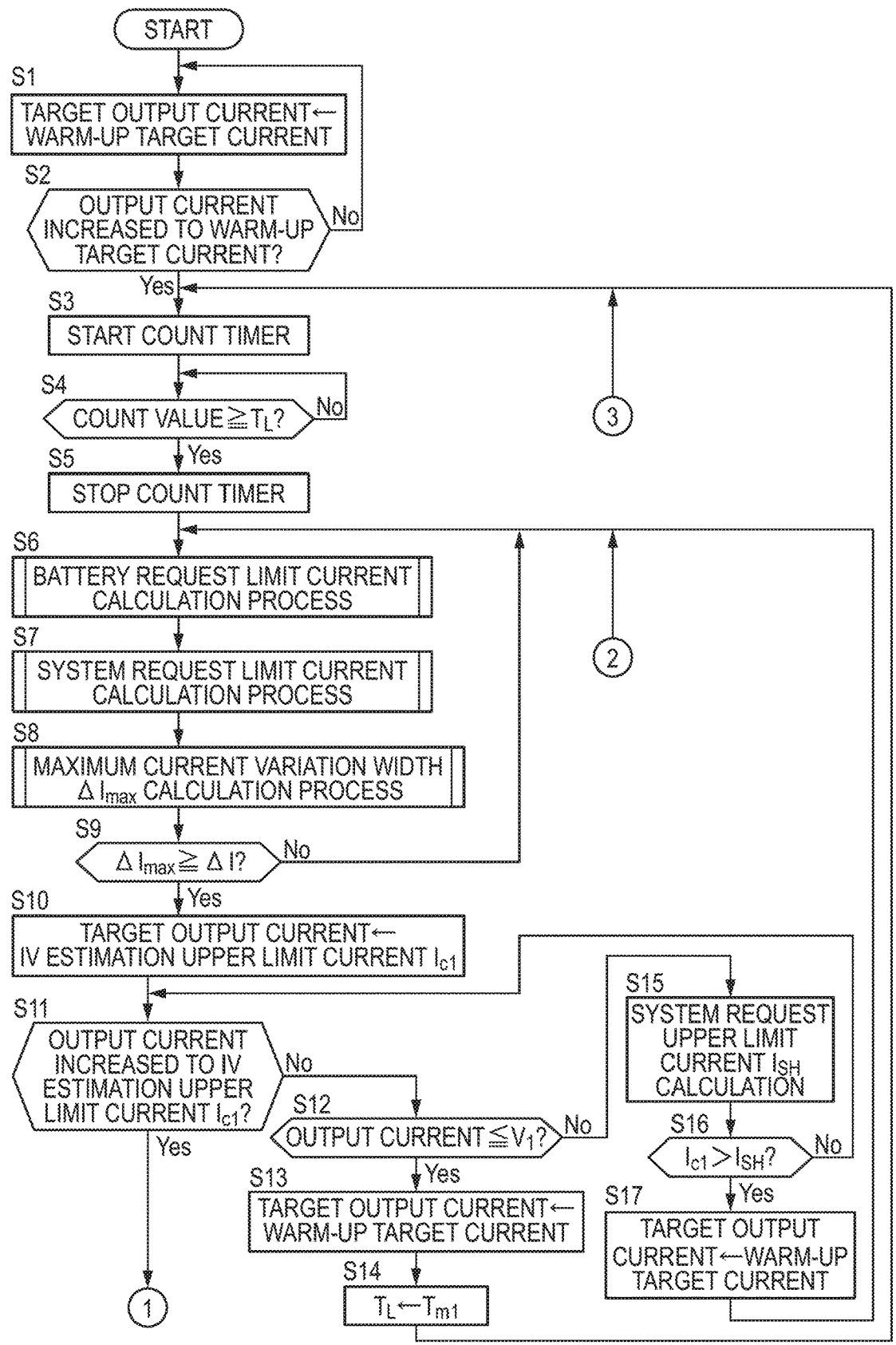
FIG. 6A is a flow chart showing an IV characteristic estimation control according to the first embodiment.
Figure 6B:
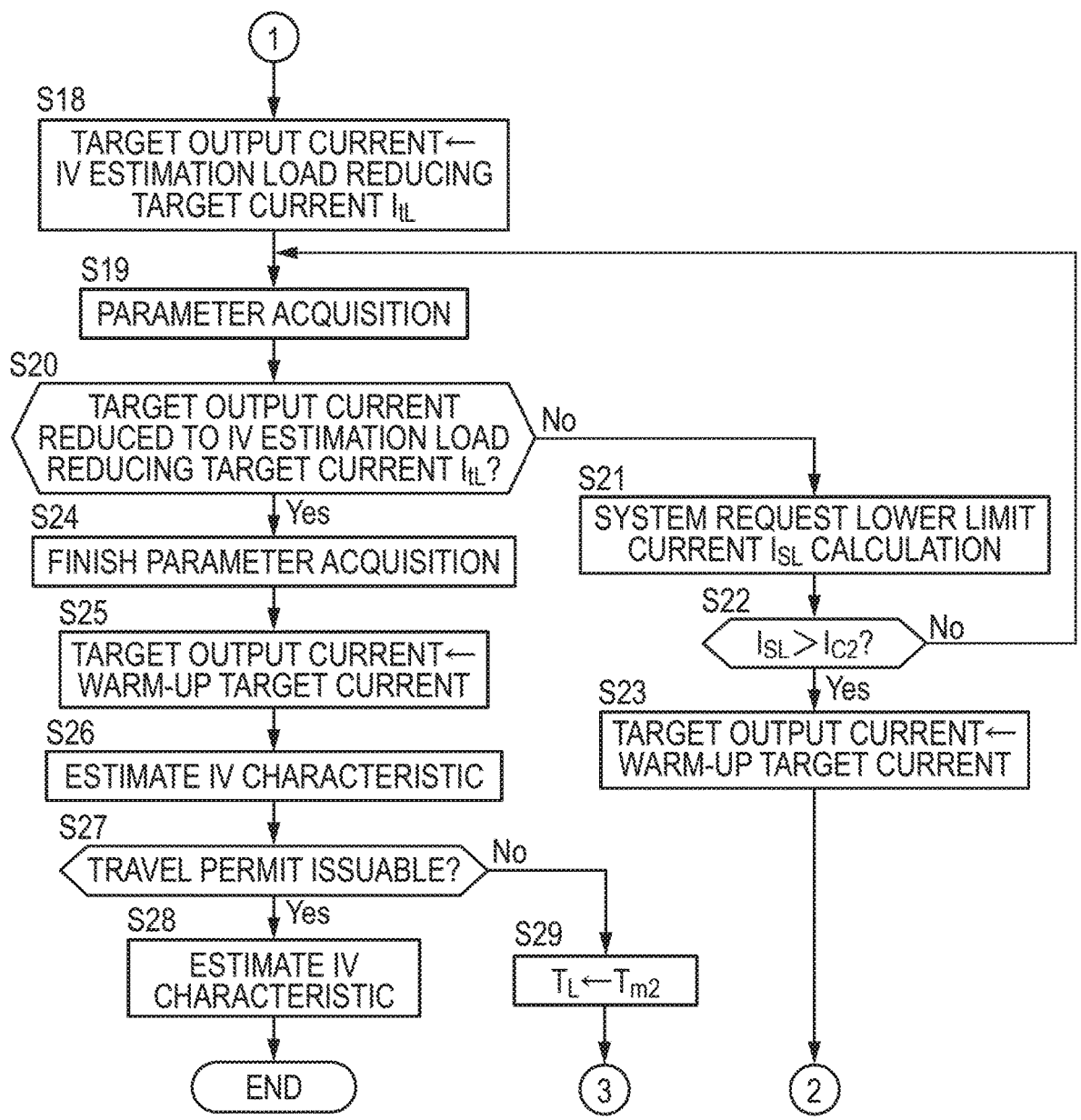
FIG. 6B is a flow chart showing the IV characteristic estimation control according to the first embodiment.

FIGS. 6A and 6B are flow charts showing an IV characteristic estimation control according to the present embodiment to be executed during warm-up.

In Step S1, the controller 6 sets the target output current of the fuel cell stack 1 to a predetermined warm-up target current $I_{WU}$ and increases the output current to the warm-up target current $I_{WU}$. The warm-up target current $I_{WU}$ is a value determined according to the consumption current of the auxiliary machines that can be driven during warm-up. In the present embodiment, the warm-up target current $I_{WU}$ is increased by making the consumption current of the auxiliary machines during warm-up as large as possible to promote warm-up by self-heat generation of the fuel cell stack 1. It should be noted that a processing of Step S1 performed by the controller 6 corresponds to warm-up unit that warms up the fuel cell stack 1 by adjusting power supplied to the auxiliary machines as loads such that the output current reaches the predetermined warm-up target current during the warm-up of the fuel cell stack 1.

In Step S2, the controller 6 determines whether or not the output current has increased to the warm-up target current $I_{WU}$. The controller 6 performs a processing of Step S3 if the output current has increased to the warm-up target current $I_{WU}$. On the other hand, unless the output current has increased to the warm-up target current $I_{WU}$, the controller 6 returns to the processing of Step S1 to subsequently increase the output current to the warm-up target current $I_{WU}$.

In Step S3, the controller 6 starts a count timer.

In Step S4, the controller 6 determines whether or not an elapsed time from the start of the count timer (hereinafter, referred to as a "count value") has become equal to or larger than an IV estimation start permit threshold value $T_L$. An initial value of the count value is set at zero. The controller 6 performs a processing of Step S5 if the count value is not smaller than the IV estimation start permit threshold value $T_L$. On the other hand, the controller 6 performs a processing of Step S4 until the count value becomes equal to or larger than the IV estimation start permit threshold value $T_L$ if the count value is below the IV estimation start permit threshold value $T_L$.

In Step S5, the controller 6 stops the count timer and resets the count value to zero.

In Step S6, the controller 6 performs a battery request limit current calculation process. This process is a process of calculating an upper limit value (hereinafter, referred to as a "battery request upper limit current $I_{BH}$") and a lower limit value (hereinafter, referred to as a "battery request lower limit current $I_{BL}$") of the output current set according to the state of the battery 55. The detail of the battery request limit current calculation process is described with reference to a flow chart of FIG. 7.

Figure 7:
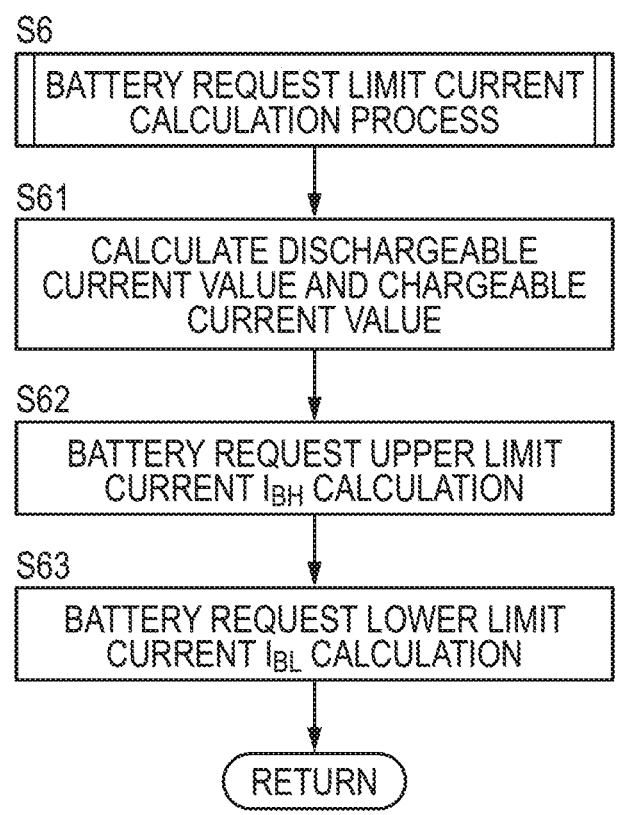
FIG. 7 is a flow chart showing a battery request limit current calculation process.

FIG. 7 is a flow chart showing the battery request limit current calculation process.

In Step S61, the controller 6 calculates a maximum value of the current that can be extracted from the battery 55 (hereinafter, referred to as a "dischargeable current value") and a maximum value of the current that can flow into the battery 55 (hereinafter, referred to as a "chargeable current value") on the basis of a battery charge amount and a battery temperature.

In Step S62, the controller 6 calculates a current value obtained by adding the chargeable current value to the warm-up target current $I_{WU}$ as the battery request upper limit current $I_{BH}$. The battery request upper limit current $I_{BH}$ is such a current value that the battery 55 is overcharged and may be deteriorated if the output current becomes larger than that.

In Step S63, the controller 6 calculates a current value obtained by subtracting the dischargeable current value from the warm-up target current $I_{WU}$ as the battery request lower limit current $I_{BL}$. The battery request lower limit current $I_{BL}$ is such a current value that the battery 55 is over-discharged and may be deteriorated if the output current becomes smaller than that.

The IV characteristic estimation control is described again below, referring back to the flow chart of FIG. 6A.

In Step S7, the controller 6 performs the system request limit current calculation process. This process is a process of calculating an upper limit value (hereinafter, referred to as a "system request upper limit current $I_{SH}$") and a lower limit value (hereinafter, referred to as a "system request lower limit current $I_{SL}$") of the output current set according to the operating state of the fuel cell system 100. Specifically, the process performed by the controller 6 corresponds to limit value setting unit that sets at least one of an upper limit value and a lower limit value of the output current on the basis of the operating state of the fuel cell system 100. The detail of the system request limit current calculation process is described with reference to a flow chart of FIG. 8.

Figure 8:
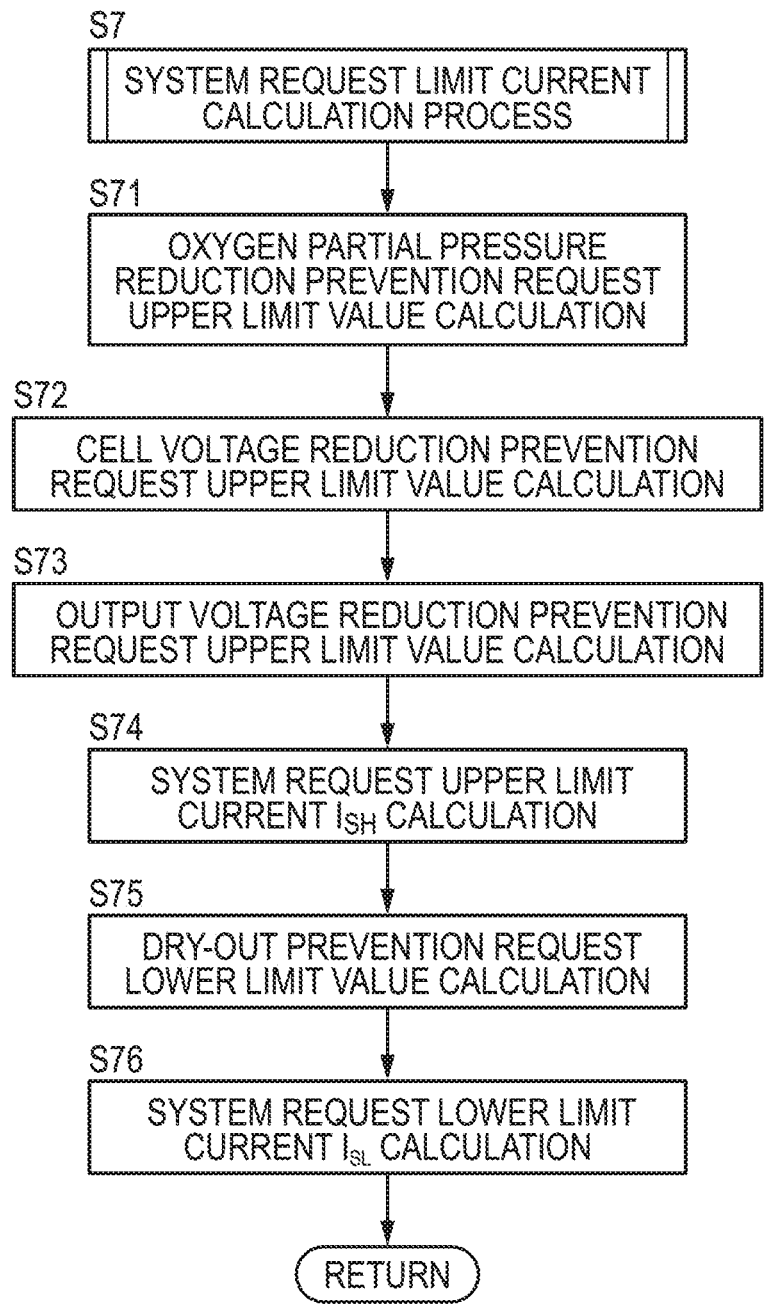
FIG. 8 is a flow chart showing a system request limit current calculation process.

FIG. 8 is a flow chart showing the system request limit current calculation process.

Figure 9:
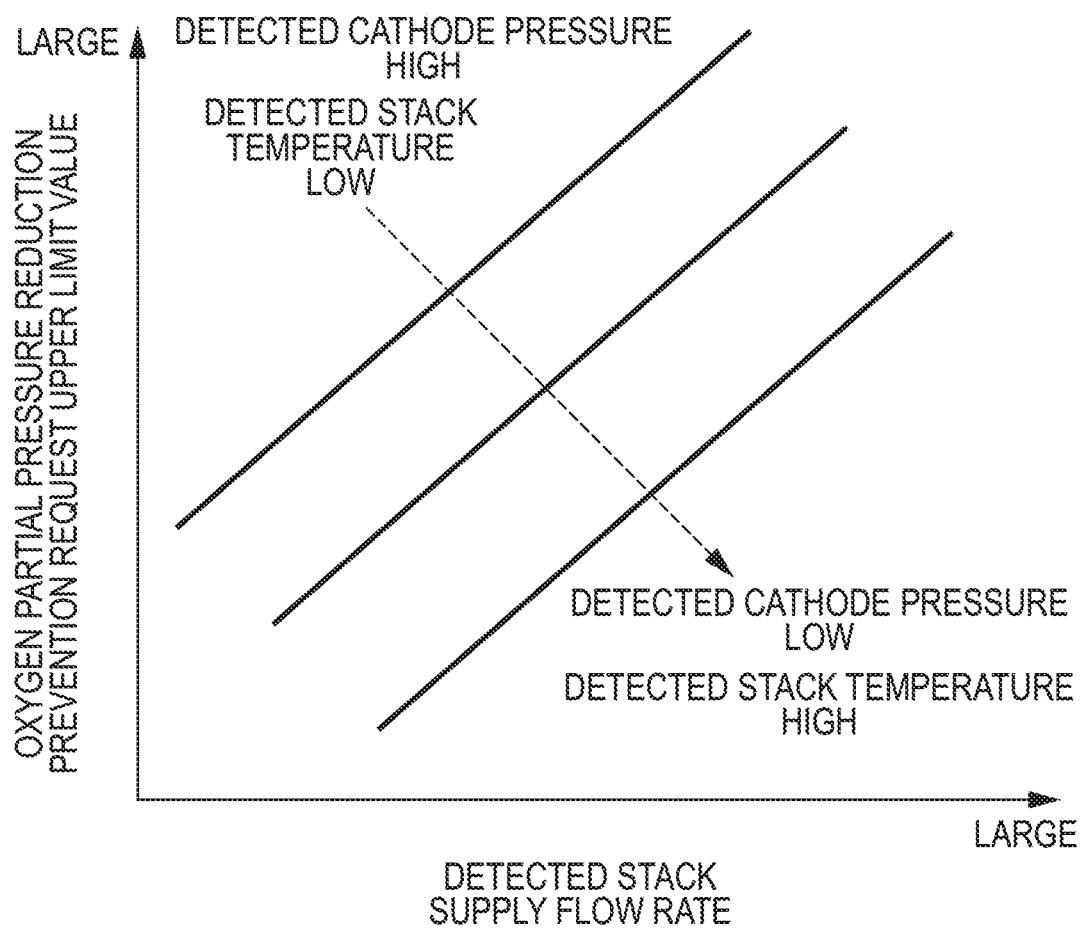
FIG. 9 is a map for calculating an oxygen partial pressure reduction prevention request upper limit value.

In Step S71, the controller 6 refers to a map of FIG. 9 and calculates an oxygen partial pressure reduction prevention request upper limit value on the basis of the detected cathode pressure, the detected stack temperature and the detected stack supply flow rate. The oxygen partial pressure reduction prevention request upper limit value is a maximum value of the output current that may be extracted from the fuel cell stack 1 when a flow rate of the cathode gas to be supplied to the fuel cell stack 1 is the detected stack supply flow rate. If the current larger than the oxygen partial pressure reduction prevention request upper limit value is extracted, an oxygen consumption amount may become too large relative to a cathode gas supply amount, whereby the oxygen partial pressure in the cathode gas flow passages 131 may decrease and the output voltage may largely decrease.

Figure 10:
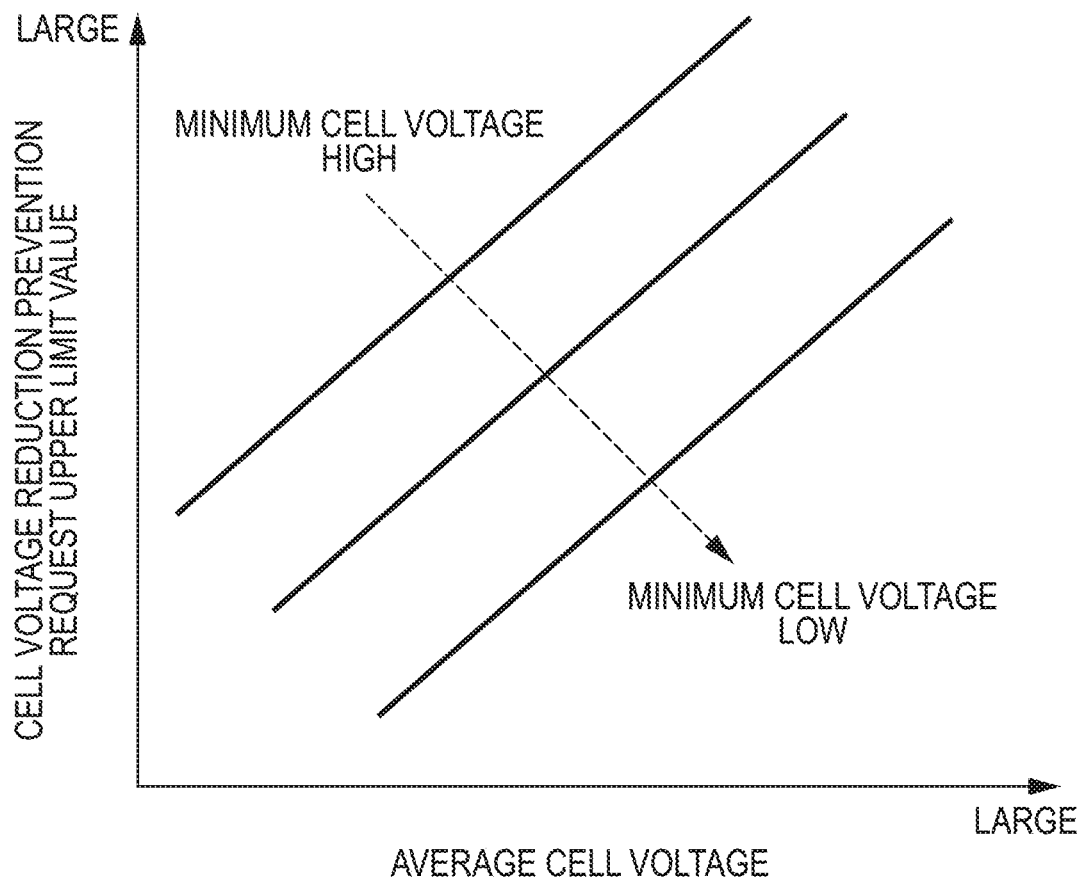
FIG. 10 is a map for calculating a cell voltage reduction prevention request upper limit value.

In Step S72, the controller 6 refers to a map of FIG. 10 and calculates a cell voltage reduction prevention request upper limit value on the basis of an average cell voltage and a minimum cell voltage. The cell voltage reduction prevention request upper limit value is a maximum value of the output current to prevent the cell voltage from dropping below a predetermined cell voltage lower limit threshold value set in advance. If power generation is continued in a state where the cell voltage is below the cell voltage lower limit threshold value, the fuel cells 10 may be deteriorated such as due to an overheated state of the fuel cells 10.

Figure 11:
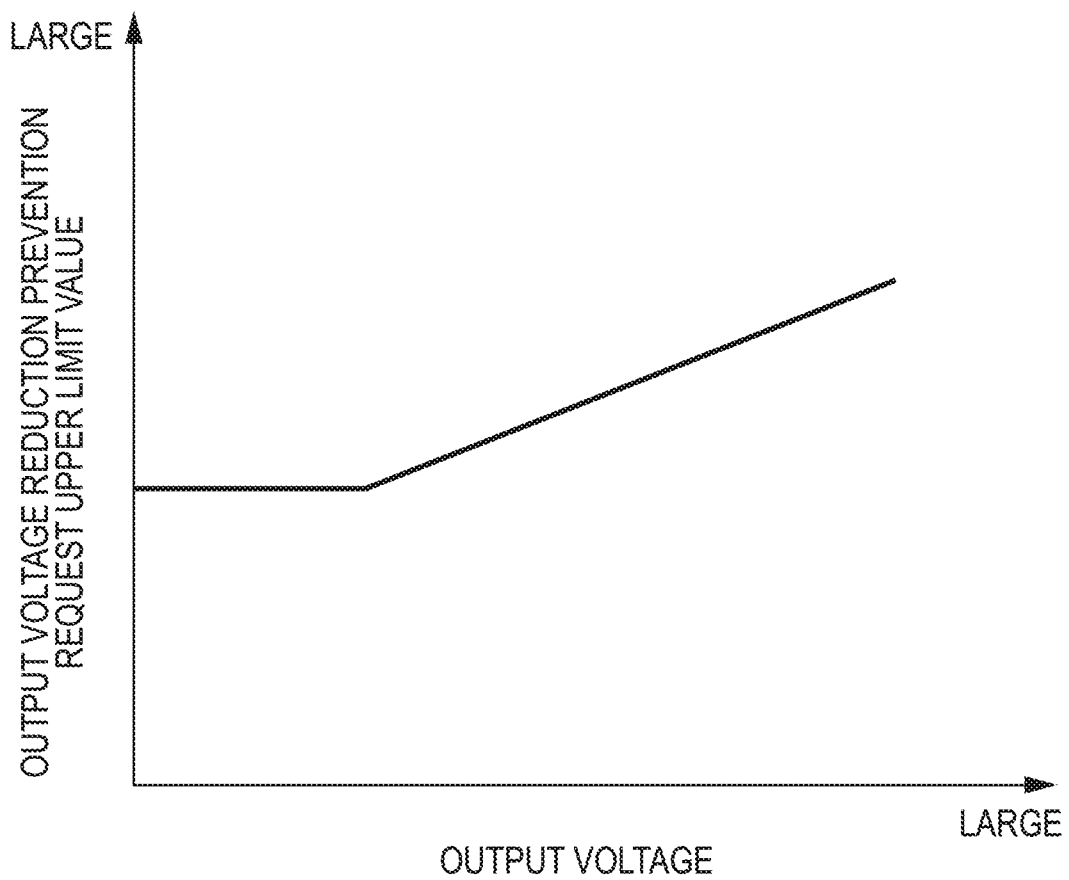
FIG. 11 is a table for calculating an output voltage reduction prevention request upper limit value.

In Step S73, the controller 6 refers to a table of FIG. 11 and calculates an output voltage reduction prevention request upper limit value on the basis of the output voltage. The output voltage reduction prevention request upper limit value is a maximum value of the output current to prevent the output voltage from dropping below an output voltage lower limit threshold value set in advance. If the output current is increased in a state where the output voltage is below the output voltage lower limit threshold value, the output voltage may largely decrease and the fuel cells 10 may be deteriorated.

In Step S74, the controller 6 calculates the smallest one of the oxygen partial pressure reduction prevention request upper limit value, the cell voltage reduction prevention request upper limit value and the output voltage reduction prevention request upper limit value as the system request upper limit current $I_{SH}$.

Figure 12:
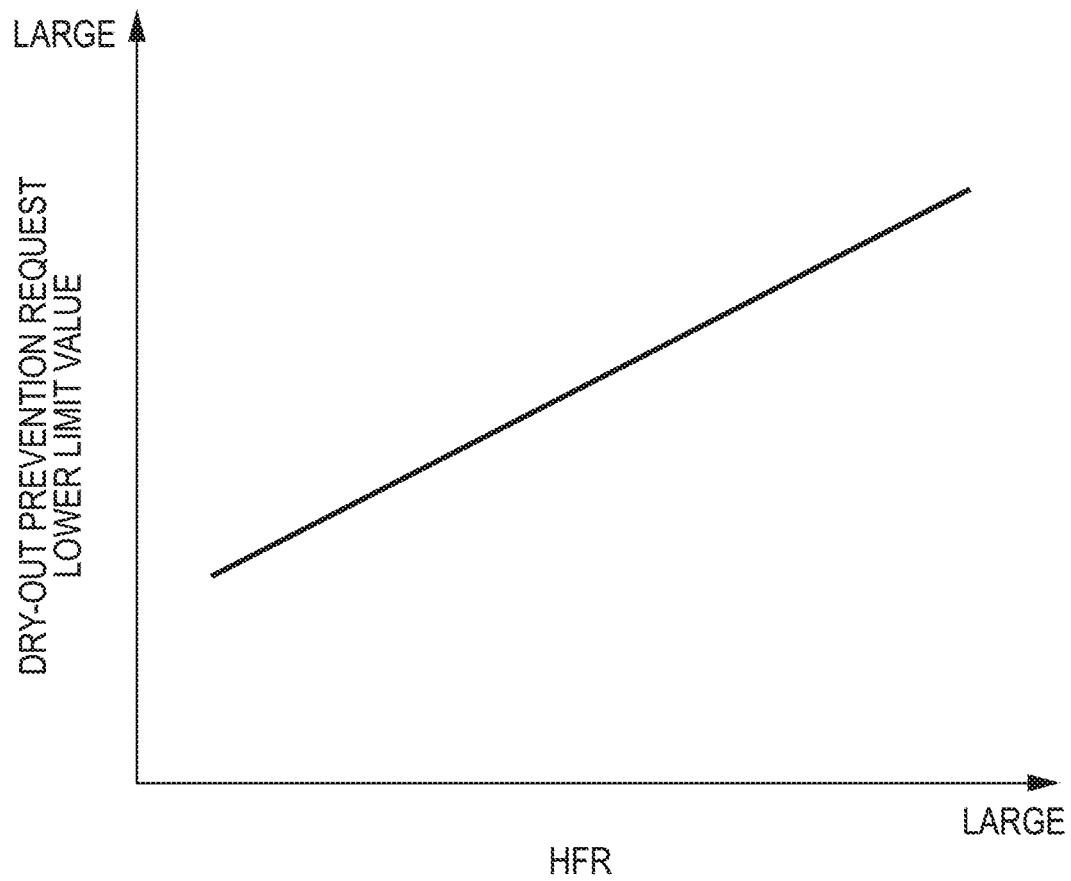
FIG. 12 is a table for calculating a dry-out prevention request upper limit value.

In Step S75, the controller 6 refers to a table of FIG. 12 and calculates a dry-out prevention request lower limit value on the basis of the HFR. The dry-out prevention request lower limit value is a lower limit value of the output current set to prevent the occurrence of a dry-out phenomenon in which power generation efficiency is reduced due to the dry-out of the electrolyte membranes 111.

In Step S76, the controller 6 calculates the larger one of the dry-out prevention request lower limit value and a predetermined high potential deterioration prevention request lower limit value determined by an experiment or the like in advance as the system request lower limit current $I_{SL}$. The high potential deterioration prevention request lower limit value is a lower limit value of the output current set to prevent the occurrence of a high potential deterioration phenomenon in which a catalyst of an electrode catalyst layer is covered with an oxide film and power generation efficiency is reduced when the cell voltage becomes a high potential.

The IV characteristic estimation control is described again below, referring back to the flow chart of FIG. 6A.

In Step S8, the controller 6 performs a process of calculating a maximum value (hereinafter, referred to as a "maximum current variation width") $\Delta I_{max}$ of the variation width of the output current (hereinafter, referred to as a "current variation width"). The detail of this maximum current variation width calculation process is described with reference to a flow chart of FIG. 13.

Figure 13:
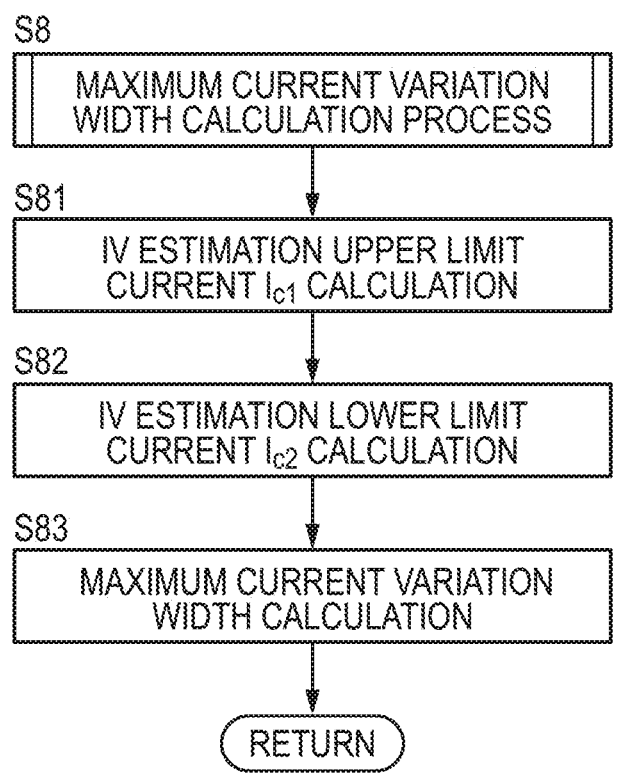
FIG. 13 is a flow chart showing a maximum current variation width calculation process.

FIG. 13 is a flow chart showing the maximum current variation width calculation process.

In Step S81, the controller 6 calculates an upper limit value of the output current in varying the output current during IV estimation (hereinafter, referred to as an "IV estimation upper limit current $I_{c1}$"). Specifically, the controller 6 calculates the smaller one of the battery request upper limit current $I_{BH}$ and the system request upper limit current $I_{SH}$ as the IV estimation upper limit current $I_{c1}$.

In Step S82, the controller 6 calculates a lower limit value of the output current in varying the output current during IV estimation (hereinafter, referred to as an "IV estimation lower limit current $I_{c2}$"). Specifically, the largest one of the battery request lower limit current $I_{BL}$, the system request lower limit current $I_{SL}$ and the IV estimation accuracy ensuring request lower limit current $I_{min}$ is calculated as the IV estimation lower limit current $I_{c2}$.

In Step S83, the controller 6 calculates a difference value between the IV estimation upper limit current $I_{c1}$ and the IV estimation lower limit current $I_{c2}$ as the maximum current variation width $\Delta I_{max}$.

The IV characteristic estimation control is described again below, referring back to the flow chart of FIG. 6A.

In Step S9, the controller 6 determines whether or not the maximum current variation width $\Delta I_{max}$ is not smaller than a predetermined current variation width $\Delta I$ necessary to ensure the estimation accuracy of the IV characteristic. The controller 6 performs a processing of Step S10 if the maximum current variation width $\Delta I_{max}$ is not smaller than the current variation width $\Delta I$. On the other hand, the controller 6 returns to the processing of Step 6 if the maximum current variation width $\Delta I_{max}$ is smaller than the current variation width $\Delta I$.

In Step 10, the controller 6 sets the target output current of the fuel cell stack 1 to the IV estimation upper limit current $I_{c1}$ to start the IV estimation process and increases the output current from the warm-up target current $I_{WU}$ to the IV estimation upper limit current $I_{c1}$. The IV estimation process performed by the controller 6 corresponds to IV estimation unit that varies the output current of the fuel cell stack 1 with a predetermined width by adjusting power supplied to the auxiliary machines as loads during the warm-up of the fuel cell stack 1 and estimating the IV characteristic of the fuel cell stack 1 on the basis of at least two sets of the output current value and the output voltage value detected while the output current is varied.

In Step S11, the controller 6 determines whether or not the output current has increased to the IV estimation upper limit current $I_{c1}$. The controller 6 performs a processing of Step S18 if the output current has increased to the IV estimation upper limit current $I_{c1}$. On the other hand, the controller 6 performs a processing of Step S12 if the output current is being increased to the IV estimation upper limit current $I_{c1}$.

In Step S12, the controller 6 determines whether or not the output current is not higher than the predetermined voltage $V_1$. Specifically, it is determined whether or not the output voltage has dropped to the predetermined voltage $V_1$ while the output current is being increased to the IV estimation upper limit current $I_{c1}$. This predetermined voltage $V_1$ is a voltage value higher than the system minimum voltage $V_{min}$ and a threshold value set to prevent a drop of the output voltage to the system minimum voltage $V_{min}$ with an increase of the output current. It should be noted that the processing of Step S12 performed by the controller 6 corresponds to judgment unit that judges whether or not a state of power generation of the fuel cell stack 1 is in a good state where the IV characteristic can be estimated during the execution of the IV estimation unit.

The controller 6 performs a processing of Step S13 if the output voltage has dropped to the predetermined voltage $V_1$. On the other hand, the controller 6 performs a processing of Step S15 unless the output voltage has dropped to the predetermined voltage $V_1$.

It should be noted that whether or not the minimum cell voltage is not higher than a predetermined cell voltage $V_2$ may also be determined in Step S12 or instead of the processing of Step S12. The predetermined cell voltage $V_2$ is equivalent to a value obtained by dividing the predetermined voltage $V_1$ by a total cell number.

In Step S13, the controller 6 stops the IV estimation process since the output voltage may further decrease from the predetermined voltage $V_1$ and drop below the system minimum voltage $V_{min}$ if the output current is increased further than this. Specifically, the controller 6 stops the execution of the IV estimation process if the state of power generation of the fuel cell stack 1 is determined to be not in the good state. Specifically, the controller 6 sets the target output current to the warm-up target current $I_{WU}$ and reduces the output current increased toward the IV estimation upper limit current $I_{c1}$ toward the warm-up target current $I_{WU}$. It should be noted that the processing of Step S13 performed by the controller 6 corresponds to an IV estimation stop step of stopping the execution of the IV estimation process on the basis of the output voltage of the fuel cell stack 1.

In Step S14, the controller 6 sets the IV estimation start permit threshold value $T_L$ to a first predetermined value $T_{m1}$. Then, a return is made to Step S3 to start the count timer, and the IV estimation process is resumed when the count value becomes equal to or larger than the first predetermined value $T_{m1}$.

Here, in the present embodiment, the first predetermined value $T_{m1}$ is set at a relatively large value of, for example, about several tens of seconds. This is because a drop of the output voltage to the predetermined voltage $V_1$ while the output current is being increased toward the IV estimation upper limit current $I_{c1}$ can be thought to indicate a state where the warm-up is not very much in progress and a deviation between the actual IV characteristic and the reference IV characteristic is large. Specifically, a state where the warm-up of the fuel cell stack 1 is still insufficient and the IV characteristic is poor can be thought.

Accordingly, if the IV estimation process is resumed only after a time interval, which is not very long, in such a state, the output voltage may drop to the predetermined voltage $V_1$ again and the IV estimation process may have to be stopped. If the IV estimation process is started, the output current is increased from the warm-up target current $I_{WU}$ to the IV estimation upper limit current $I_{c1}$ and an excess current that cannot flow into the auxiliary machines flows into the battery 55. Thus, if the IV estimation process is uselessly performed many times, the battery charge amount increases and the battery request upper limit current $I_{BH}$ gradually decreases, whereby it may become impossible to ensure the predetermined current variation width ΔI. Further, burdens of the battery 55 also increase.

Accordingly, in the present embodiment, a certain time interval is provided in such a state and the IV estimation process is performed after waiting for the recovery of the IV characteristic. This can prevent the IV estimation process from being uselessly performed many times.

It should be noted that although the first predetermined value $T_{m1}$ is a fixed value determined in advance in the present embodiment, it may be a variable value. For example, the first predetermined value $T_{m1}$ may be set on the basis of the output current value when the output voltage reaches the predetermined voltage $V_1$. In this case, the first predetermined value $T_{m1}$ is desirably increased as the output current value decreases. This is because it can be judged that the smaller the output current value when the output voltage reaches the predetermined voltage $V_1$, the larger the deviation between the actual IV characteristic and the reference IV characteristic and the poorer the IV characteristic.

In Step S15, the controller 6 calculates the system request upper limit current $I_{SH}$ again.

In Step S16, the controller 6 compares the magnitudes of the target output current set in Step S10, i.e. the IV estimation upper limit current $I_{c1}$ and the system request upper limit current $I_{SH}$ calculated in Step S15. It should be noted that a processing of Step S16 corresponds to excess determination unit that determines whether or not the output current reaches the upper limit value (system request upper limit current $I_{SH}$) when the output current is varied with the predetermined variation width by the IV estimation process.

Then, the controller 6 performs a processing of Step S17 if the IV estimation upper limit current $I_{c1}$ is larger than the system request upper limit current $I_{SH}$. On the other hand, the controller 6 returns to the processing of Step S11 if the IV estimation upper limit current $I_{c1}$ is not larger than the system request upper limit current $I_{SH}$. Specifically, the controller 6 continues the execution of the IV estimation process if the state of power generation of the fuel cell stack 1 is judged to be in the good state.

In Step S17, the controller 6 stops the IV estimation process. Specifically, the target output current is set to the warm-up target current $I_{WU}$ and the output current increased toward the IV estimation upper limit current $I_{c1}$ is reduced toward the warm-up target current $I_{WU}$. It should be noted that a processing of Step S17 performed by the controller 6 corresponds to second IV estimation stop unit that stops the execution of the IV estimation process when the output current is determined to reach the upper limit value (system request upper limit current $I_{SH}$).

The IV estimation process is stopped in Step S17 for the following reason. The IV estimation upper limit current $I_{c1}$ may become larger than the system request upper limit current $I_{SH}$, for example, if the system request upper limit current $I_{SH}$ is updated and reduced while the output current is being increased toward the IV estimation upper limit current $I_{c1}$. If the output current is increased to the IV estimation upper limit current $I_{c1}$ beyond the system request upper limit current $I_{SH}$ in this case, it may lead to an extreme voltage drop or the deterioration of the fuel cells. Thus, it is not desirable to increase the output current to the IV estimation upper limit current $I_{c1}$.

However, if the output current cannot be increased to the IV estimation upper limit current $I_{c1}$, the predetermined current variation width ΔI cannot be ensured and it may not be possible to ensure desired estimation accuracy. Accordingly, in such a case, a return is made to Step S6 to determine again whether or not the predetermined current variation width ΔI can be ensured and the IV estimation process is performed.

In Step S18, the controller 6 sets a current value obtained by subtracting the current variation width Δ1 from the IV estimation upper limit current $I_{c1}$ (hereinafter, referred to as an "IV estimation load reducing target current $I_{tL}$") as the target output current of the fuel cell stack 1. Then, the output current is reduced from the IV estimation upper limit current $I_{c1}$ to the IV estimation load reducing target current $I_{tL}$.

In Step S19, the controller 6 appropriately acquires the aforementioned three parameters (actual output current, reference voltage and actual output voltage) while the output current is being reduced.

In Step S20, the controller 6 determines whether or not the output current has been reduced to the IV estimation load reducing target current $I_{tL}$. The controller 6 performs a processing of Step S24 if the output current has been reduced to the IV estimation load reducing target current $I_{tL}$. On the other hand, the controller 6 performs a processing of Step S21 if the output current is being reduced to the IV estimation load reducing target current $I_{tL}$.

In Step S21, the controller 6 calculates the system request lower limit current $I_{SL}$ again.

In Step S22, the controller 6 compares the magnitudes of the target output current set in Step S18, i.e. the IV estimation load reducing lower limit current $I_{tL}$ and the system request lower limit current $I_{SL}$ calculated in Step S21. Then, the controller 6 performs a processing of Step S23 if the system request lower limit current $I_{SL}$ is larger than the IV estimation load reducing target current $I_{tL}$. On the other hand, the controller 6 returns to the processing of Step S19 if the system request lower limit current $I_{SL}$ is not higher than the IV estimation load reducing target current $I_{tL}$. It should be noted that a processing of Step S22 performed by the controller 6 corresponds to excess determination unit that determines whether or not the output current reaches the lower limit value (system request lower limit current $I_{SL}$) when the output current is varied with the predetermined width by the IV estimation process.

In Step S23, the controller 6 stops the IV estimation process. Specifically, the target output current is set to the warm-up target current $I_{WU}$ and the output current reduced toward the IV estimation loading reading target current $I_{tL}$ is controlled toward the warm-up target current $I_{WU}$. It should be noted that a processing of Step S23 performed by the controller 6 corresponds to second IV estimation stop unit that stops the execution of the IV estimation process when the output current is determined to reach the lower limit value (system request lower limit current $I_{SL}$).

The IV estimation process is stopped in Step S23 for the following reason. While the output current is being reduced toward the IV estimation load reducing target current $I_{tL}$, the system request lower limit current $I_{SL}$ may be, for example, updated and increased and become larger than IV estimation load reducing target current $I_{tL}$. If the output current is reduced below the system request lower limit current $I_{SL}$ in this case, it may cause the dry-out phenomenon or the high potential deterioration phenomenon. Thus, it is not desirable to reduce the output current to the IV estimation load reducing target current $I_{tL}$.

However, if the output current cannot be reduced to the IV estimation load reducing target current $I_{tL}$, the predetermined current variation width ΔI cannot be ensured and it may not be possible to ensure desired estimation accuracy. Accordingly, in such a case, a return is made to Step S6 to determine again whether or not the predetermined current variation width ΔI can be ensured and the IV estimation process is performed.

In Step S24, the controller 6 finishes the acquisition of the parameters.

In Step S25, the controller 6 sets the target output current to the warm-up target current $I_{WU}$ and controls the output current toward the warm-up target current $I_{WU}$.

In Step S26, the controller 6 estimates the IV characteristic on the basis of a plurality of acquired parameter groups. As just described, the controller 6 performs the IV estimation process in a series of processings from Step S1 to Step S26.

It should be noted that the series of processings from Step S1 to Step S26 performed by the controller 6 correspond to an IV estimation step of varying the output current of the fuel cell stack 1 with the predetermined width by adjusting power supplied to the loads during the warm-up of the fuel cell stack 1 and estimating the IV characteristic of the fuel cell stack 1 on the basis of at least two sets of the output current value and the output voltage value detected while the output current is varied.

In Step S27, the controller 6 determines whether or not the travel permit is issuable. Specifically, the controller 6 determines whether or not the estimated IV characteristic is the predetermined IV characteristic in which the output voltage of the fuel cell stack 1 does not drop below the system minimum voltage $V_{min}$ even if the travel motor 53 is driven. It should be noted that a processing of Step S27 performed by the controller 6 corresponds to IV characteristic determination unit that determines whether or not the IV characteristic estimated by the IV estimation process has reached the predetermined IV characteristic.

The controller 6 performs a processing of Step S28 if the travel permit is issuable while performing a processing of Step S29 if it is not.

In Step S28, the controller 6 issues the travel permit and finishes the IV characteristic estimation control.

In Step S29, the controller 6 sets the IV estimation start permit threshold value $T_L$ to a second predetermined value $T_{m2}$. Then, a return is made to Step S3 to start the count timer, and the IV estimation process is resumed when the count value becomes equal to or larger than the second predetermined value $T_{m2}$.

Here, in the present embodiment, the second predetermined value $T_{m2}$ is set, for example, at about several seconds, and a value smaller than the first predetermined value $T_{m1}$. This is because, if the travel permit could not be issued although the IV characteristic could be estimated, the IV characteristic can be estimated even if the IV estimation process is resumed in a relatively short time interval unlike the case where the output voltage drops to or below the predetermined voltage $V_1$ and the IV estimation process is stopped. Thus, whether or not the travel permit is issuable can be more quickly determined when the IV estimation process is resumed in a relative short time interval.

Figure 14:
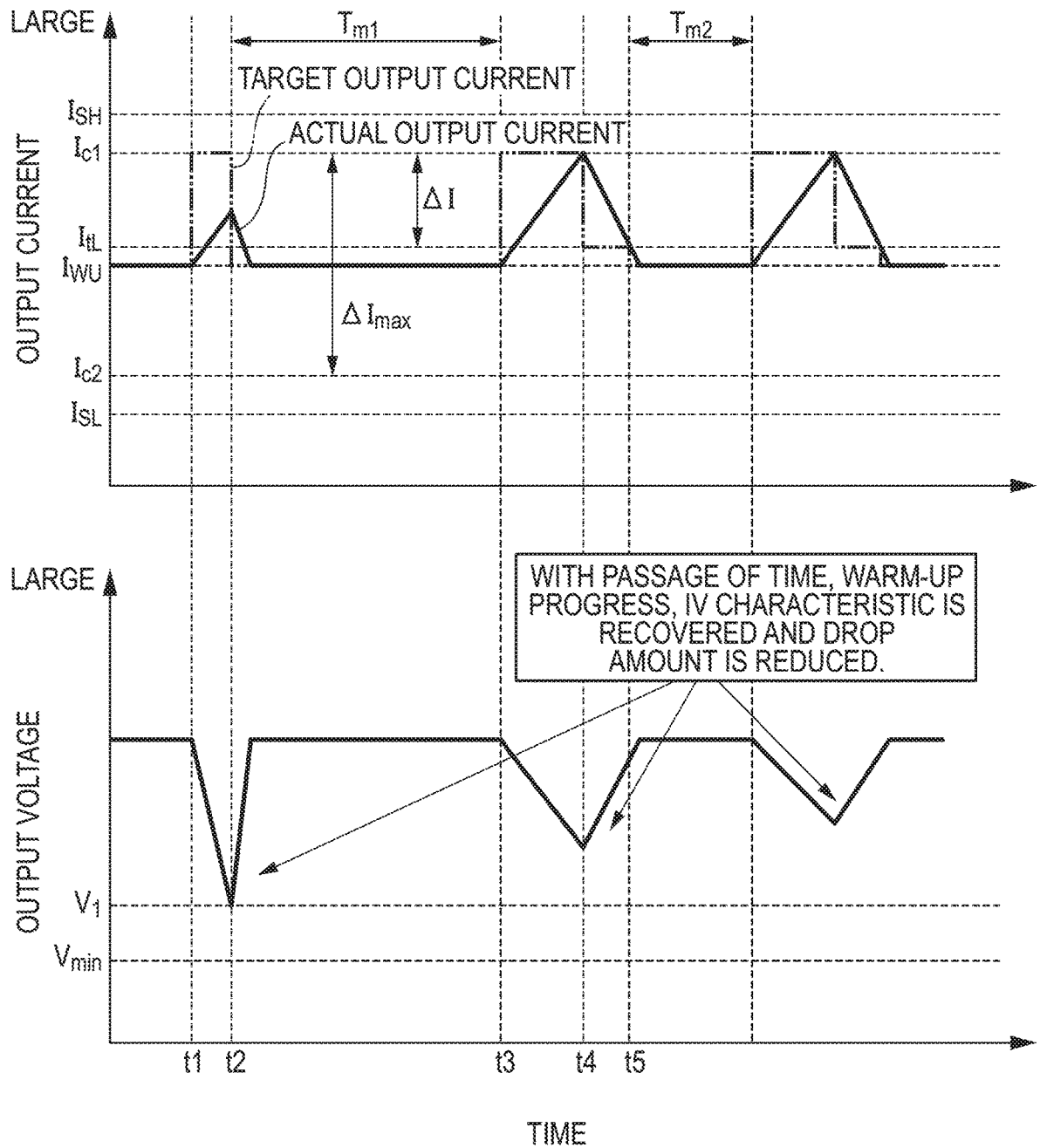
FIG. 14 is a time chart showing an example of the operation of the IV characteristic estimation control according to the first embodiment.

FIG. 14 is a time chart showing an example of the operation of the IV characteristic estimation control according to the present embodiment.

After the start-up of the fuel cell system 100, the output current is controlled to the warm-up target current $I_{WU}$ at time t1 (Yes in S2). When the maximum current variation width $\Delta I_{max}$ is determined to be not smaller than the predetermined current variation width ΔI (Yes in S9), the controller 6 starts the IV estimation process. Specifically, the target output current is set to the IV estimation upper limit current $I_{c1}$ and the output current is increased from the warm-up target current $I_{WU}$ to the IV estimation upper limit current $I_{c1}$.

If the output voltage drops to the predetermined voltage $V_1$ at time t2 while the output current is being increased to the IV estimation upper limit current $I_{c1}$ (No in S11, Yes in S12), the controller 6 stops the IV estimation process. Specifically, the target output current is set to the warm-up target current $I_{WU}$ and the output current being increased toward the IV estimation upper limit current $I_{c1}$ is reduced toward the warm-up target current $I_{WU}$.

A drop of the output voltage to the predetermined voltage $V_1$ while the output current is being increased toward the IV estimation upper limit current $I_{c1}$ as just described can be thought to indicate the state where the warm-up is not very much in progress and the IV characteristic is poor. Thus, the controller 6 sets the IV estimation start permit threshold value $T_L$ to the first predetermined value $T_{m1}$ larger than the second predetermined value $T_{m2}$ and starts the count timer.

Since the IV estimation process is resumed after a certain time interval in this way, it can be prevented that the IV estimation process is uselessly performed many times.

When an elapsed time from time t2 becomes equal to or larger than the first predetermined value $T_{m1}$ at time t3 (Yes in S4), the controller 6 resumes the IV estimation process. Specifically, the target output current is set to the IV estimation upper limit current $I_{c1}$ and the output current is increased from the warm-up target current $I_{WU}$ toward the IV estimation upper limit current $I_{c1}$.

When the output current is increased to the IV estimation upper limit current $I_{c1}$ at time t4 (Yes in S11), the controller 6 sets the target output current to the IV estimation load reducing target current $I_{tL}$ and reduces the output current from the IV estimation upper limit current $I_{c1}$ toward the IV estimation load reducing target current $I_{tL}$. Then, the controller 6 appropriately acquires the aforementioned three parameters (actual output current, reference voltage and actual output voltage) while the output current is being reduced.

When the output current is reduced to the IV estimation load reducing target current $I_{tL}$ at time t5 (Yes in S20), the acquisition of the parameters is finished and the target output current is set to the warm-up target current $I_{WU}$. Then, the controller 6 estimates the IV characteristic on the basis of the acquired parameters and determines whether or not the travel permit is issuable.

When determining that the travel permit is not issuable (No in S27), the controller 6 sets the IV estimation start permit threshold value $T_L$ to the second predetermined value $T_{m2}$ and starts the count timer.

When an elapsed time from time t5 becomes equal to or larger than the second predetermined value $T_{m2}$ at time t6 (Yes in S4), the controller 6 resumes the IV estimation process.

When it is determined that the travel permit is not issuable as a result of estimating the IV characteristic in this way, it does not mean that the output voltage has decreased to the predetermined voltage $V_1$. Thus, it can be thought that the warm-up is in progress and the actual IV characteristic is about to approach the reference IV characteristic. Thus, the controller 6 sets the IV estimation start permit threshold value $T_L$ to the second predetermined value $T_{m2}$ and starts the count timer.

Since the IV estimation process is resumed after a time interval, which is not very long, in this way, a time until whether or not the travel permit is issuable is determined next can be shortened and whether or not the travel permit is issuable can be determined quickly.

Figure 15:
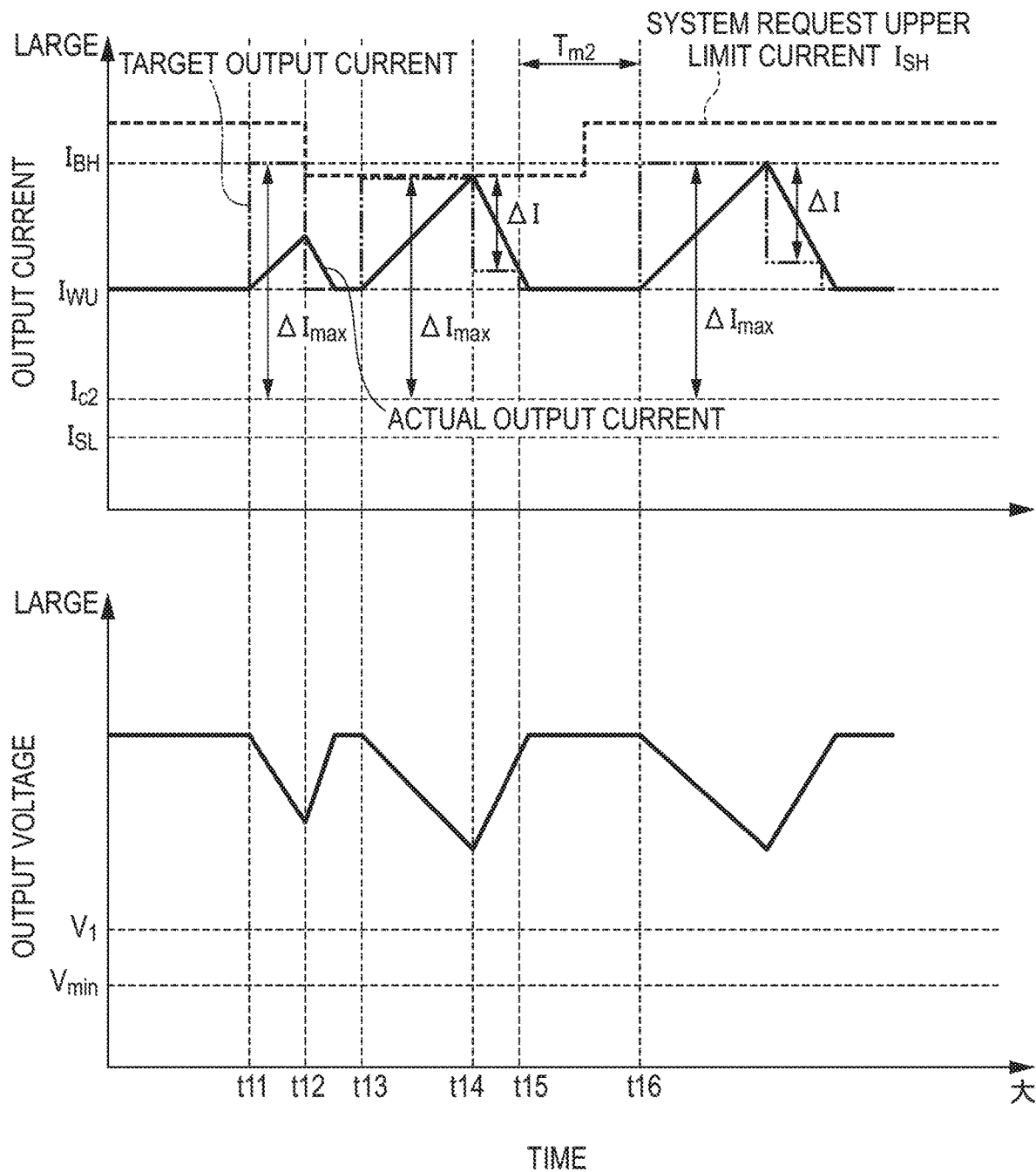
FIG. 15 is a time chart showing another example of the operation of the IV characteristic estimation control according to the first embodiment of the present invention.

FIG. 15 is a time chart showing another example of the operation of the IV characteristic estimation control according to the present embodiment.

Since the battery request upper limit current $I_{BH}$ is smaller than the system request upper limit current $I_{SH}$ at time t11, the battery request upper limit current $I_{BH}$ is calculated as the IV estimation upper limit current $I_{c1}$. Thus, at time t11, a difference value between the battery request upper limit current $I_{BH}$ and the IV estimation lower limit current $I_{c2}$ is the maximum current variation width $\Delta I_{max}$.

Since the output current is controlled to the warm-up target current $I_{WU}$ and the maximum current variation width $\Delta I_m$ is not smaller than the predetermined current variation width $\Delta I$ at time t11, the IV estimation process is started.

When the system request upper limit current $I_{SH}$ becomes smaller than the battery request upper limit current $I_{BH}$ (IV estimation upper limit current $I_{c1}$) at time t12 while the output current is being increased toward the battery request upper limit current $I_{BH}$ (IV estimation upper limit current $I_{c1}$), the controller 6 stops the IV estimation process.

This is because the maximum current variation width $\Delta I_{max}$ becomes smaller than the maximum current variation width $\Delta I_{max}$ when the IV estimation process is started at time t11 and it is not known whether or not the predetermined current variation width $\Delta I$ can be ensured if the system request upper limit current $I_{SH}$ becomes smaller than the battery request upper limit current $I_{BH}$ (IV estimation upper limit current $I_{c1}$).

Thus, when the system request upper limit current $I_{SH}$ becomes smaller than the battery request upper limit current $I_{BH}$ (IV estimation upper limit current $I_{c1}$) (Yes in S16), the IV estimation process is stopped and whether or not the maximum current variation width $\Delta I_{max}$ has become equal to or larger than the predetermined current variation width $\Delta I$ is determined again.

Since the system request upper limit current $I_{SH}$ is smaller than the battery request upper limit current $I_{BH}$ at time t13, the system request upper limit current $I_{SH}$ is calculated as the IV estimation upper limit current $I_{c1}$. Thus, at time t13, a difference value between system request upper limit current $I_{SH}$ and the IV estimation lower limit current $I_{c2}$ is the maximum current variation width $\Delta I_{max}$.

Since the maximum current variation width $\Delta I_{max}$ calculated at time t13 is not smaller than the predetermined current variation width $\Delta 1$, the controller 6 resumes the IV estimation process. Then, the controller 6 estimates the IV characteristic on the basis of the parameters acquired between time t14 and time t15. If the travel permit could not be issued as a result of estimation, the IV estimation process is resumed after an elapsed time from time t15 becomes equal to or larger than the second predetermined value $T_{m2}$ at time t16.

The fuel cell system 100 according to the present embodiment as described above includes the fuel cell stack 1 and the loads such as the auxiliary machines connected to the fuel cell stack 1 and the battery 55, and executes the IV estimation process that changes the output current of the fuel cell stack 1 with the predetermined width by adjusting power supplied to the loads during the warm-up of the fuel cell stack 1 and estimating the IV characteristic of the fuel cell stack 1 on the basis of at least two sets of the output current value and the output voltage value detected while the output current is changed.

Then, the fuel cell system 100 stops the execution of the IV estimation on the basis of power output from the fuel cell stack 1, i.e. an output of the fuel cell stack 1 during the execution of the IV estimation. For example, the fuel cell system 100 determines on the basis of the output of the fuel cell stack 1 whether or not the state of power generation of the fuel cell stack 1 is in the good state suitable for the execution of the IV estimation process and stops the execution of the IV estimation if the state of power generation of the fuel cell stack 1 is determined not to be in the good state suitable for the execution of the IV estimation process.

In the present embodiment, the fuel cell system 100 determines a state not good for the execution of the IV estimation process and stops the execution of the IV estimation process in a state of power generation where the output voltage of the fuel cell stack 1 is likely to extremely decrease, i.e. a state of power generation where a so-called voltage drop is likely to occur. This can prevent the deterioration of the state of power generation of the fuel cell stack 1 due to a voltage drop of the fuel cell stack 1 according to the execution of the IV estimation process.

As just described, according to the present embodiment, it is possible to avoid that the power generation characteristic of the fuel cell stack 1 estimated by the IV estimation process is deteriorated due to a change in the output of the fuel cell stack 1.

The fuel cell system 100 according to the present embodiment stops the execution of the IV estimation when the output voltage of the fuel cell stack 1 drops to or below the predetermined voltage $V_1$ (first predetermined value). This can suppress a drop of the output voltage to or below the predetermined voltage $V_1$ during the execution of the IV estimation. Thus, a drop of the output voltage below the system minimum voltage during the estimation of the IV characteristic can be prevented, for example, by setting the predetermined voltage $V_1$ to be not smaller than the system minimum voltage.

Further, the fuel cell system 100 according to the present embodiment sets the predetermined voltage $V_1$ (first predetermined value) at a value larger than the system minimum voltage $V_{min}$ (second predetermined value). Thus, it can be reliably suppressed that the output voltage drops to or below the system minimum voltage $V_{min}$ and the fuel cell system 100 is stopped during the execution of the IV estimation.

Further, the fuel cell system 100 according to the present embodiment executes the IV estimation again after the elapse of the first predetermined period $T_{m1}$ when the output voltage drops to or below the predetermined voltage $V_1$ and the execution of the IV estimation is stopped.

When the output voltage drops to or below the predetermined voltage $V_1$ and the execution of the IV estimation is stopped, it can be thought to indicate a state where the deviation between the actual IV characteristic and the reference IV characteristic is large and the IV characteristic is poor since the warm-up is not very much in progress. Thus, even if the IV estimation is executed without a time interval, there is a low possibility that the IV characteristic has reached the IV characteristic in which the travel permit is issuable. Thus, the IV estimation is uselessly executed.

If the IV estimation is uselessly executed many times, the battery charge amount gradually increases or decreases, whereby it may not be possible to provide the current variation width $\Delta I$ necessary to ensure IV estimation accuracy and execute the IV estimation itself. Further, the battery 55 itself may be deteriorated.

Thus, by executing the IV estimation again after the elapse of the first predetermined period $T_{m1}$ as in the fuel cell system 100 according to the present embodiment, it can be suppressed that the IV estimation is uselessly executed. In this way, it is possible to ensure the execution of the IV estimation and suppress the deterioration of the battery 55.

At this time, if the first predetermined period $T_{m1}$ is set to become longer, for example, as the output current value becomes smaller on the basis of the output current value when the output voltage reaches the predetermined voltage $V_1$, it can be further suppressed that the IV estimation is uselessly executed. This is because it can be judged that the smaller the output current value when the output voltage reaches the predetermined voltage $V_1$, the larger the deviation between the actual IV characteristic and the reference IV characteristic and the poorer the IV characteristic.

Further, the fuel cell system 100 according to the present embodiment determines whether or not the IV characteristic estimated by the IV estimation unit has reached the predetermined IV characteristic in which the travel permit is issuable. If it is determined that the predetermined IV characteristic has not been reached as a result of this determination, the IV estimation is executed again after the elapse of the second predetermined period $T_{m2}$. The first predetermined period $T_{m1}$ is set at a value longer than the second predetermined period $T_{m2}$.

In this way, the IV estimation is executed again after a certain time interval if the execution of the IV estimation is stopped halfway, i.e. the warm-up is not very much in progress. On the other hand, the IV estimation is executed again only after a time interval, which is not very long, if the IV characteristic could be estimated by the IV estimation, i.e. the warm-up is in progress to a certain extent. Thus, it can be suppressed that the IV estimation is uselessly executed when the warm-up is not very much in progress. Further, when the warm-up is in progress to a certain extent, the IV estimation is executed again only after a time interval which is not very long. Thus, a time until whether or not the travel permit is issuable is determined next can be shortened and whether or not the travel permit is issuable can be determined quickly.

Further, the fuel cell system 100 sets at least one of the system request upper limit current $I_{SH}$ (upper limit value of the output current) and the system request lower limit current $I_{SH}$ (lower limit value of the output current) on the basis of the operating state of the fuel cell system 100. Then, whether or not the output current reaches the system request upper limit current $I_{SH}$ or the system request lower limit current $I_{SH}$ in the case of varying the output current with the predetermined width by the IV estimation (S16, S22). When the output current is determined to reach the system request upper limit current $I_{SH}$ or the system request lower limit current $I_{SH}$, the execution of the IV estimation is stopped.

If the output current reaches the system request upper limit current $I_{SH}$ or the system request lower limit current $I_{SL}$ when the output current is varied with the predetermined width by the IV estimation, the output current cannot be varied any further. Then, the output current may not be able to be varied with the predetermined width and the estimation accuracy of the IV characteristic is reduced.

Accordingly, if the output current is determined to reach the system request upper limit current $I_{SH}$ or the system request lower limit current $I_{SL}$, the estimation accuracy of the IV characteristic can be ensured by stopping the execution of the IV estimation.

Further, the fuel cell system 100 according to the present embodiment warms up the fuel cell stack 1 by adjusting the power supplied to the loads such that the output current reaches the predetermined warm-up target current $I_{WU}$ during the warm-up of the fuel cell stack 1. When the IV estimation is executed, the power supplied to the loads is adjusted to increase the output current from the warm-up target current $I_{WU}$ and the output current of the fuel cell stack 1 is varied with the predetermined width.

Since the output current needs not be reduced from the warm-up target current $I_{WU}$ set to promote the warm-up in this way, the deterioration of warm-up performance can be suppressed.

Further, the fuel cell system 100 according to the present embodiment judges whether or not the output voltage has dropped to or below the predetermined voltage $V_1$ (first predetermined value) when the output current is being increased. The output voltage decreases with an increase of the output current. Thus, a computational load of the controller 6 can be reduced by making such a judgment only in a scene where the output voltage decreases.

Second Embodiment

It should be noted that, in the present embodiment, an IV characteristic is estimated by observing a change of an output voltage when an output current is changed with a specified current width or larger in an area where an output current of a fuel cell system 1 is not smaller than a predetermined current, utilizing that a relationship of the output current and the output voltage can be approximated by a linear function in that area.

In such a case, to accurately estimate the IV characteristic during warm-up in which no travel permit is issued, the output current needs to be varied with a specified variation width or larger from the IV estimation accuracy ensuring request lower limit current $I_{min}$ to the pre-travel permit upper limit current as shown in FIG. 5.

Here, to ensure the specified variation width or larger, it is desirable to increase the pre-travel permit upper limit current by making the auxiliary machine consumption current as large as possible. Further, the warm-up of a fuel cell stack 1 by self-heat generation can also be promoted by making the auxiliary machine consumption current larger. Thus, in the present embodiment, the consumption current of the auxiliary machines connected to the fuel cell stack 1 is increased and the output current is caused to flow also into the battery 55 in order to change the output current with the specified current width or larger in the area where the output current is not smaller than the predetermined current.

However, depending on the condition of the auxiliary machines, there are cases where the consumption current of the auxiliary machines cannot be sufficiently increased. If it is attempted to change the output current with the specified current width or larger in this case, the output current may have to be changed in an area below the predetermined current. Since the relationship of the output current and the output voltage cannot be approximated by a linear function in the area where the output current is below the predetermined current, the estimation accuracy of the IV characteristic is deteriorated if the output current has to be changed in the area below the predetermined current.

For example, there are cases where, depending on the operating state of the fuel cell stack 100 during warm-up, the auxiliary machine consumption current cannot be increased such as because the consumption current of the PTC heater 46 has to be reduced to prevent the bumping of cooling water. In such cases, the pre-travel permit upper limit current is also reduced. Thus, the output current may drop below the IV estimation accuracy ensuring request lower limit current $I_{min}$, for example, if the output current is reduced by a specified amount from the pre-travel permit upper limit current.

As just described, if the output current drops below the IV estimation accuracy ensuring request lower limit current $I_{min}$ when parameters are acquired while the output current is reduced, the relationship of the actual output current Ir and the voltage difference ΔV cannot be approximated by a linear function in an area at and below the IV estimation accuracy ensuring request lower limit current $I_{min}$. Thus, the estimation accuracy of the IV characteristic is drastically reduced.

Accordingly, in the second embodiment of the present invention, a controller 6 temporarily stops the estimation of the IV characteristic if the output current is judged to drop below the IV estimation accuracy ensuring request lower limit current $I_{min}$ when the output current is reduced by a specified amount after being increased to estimate the IV characteristic.

It should be noted that since the configuration of a fuel cell system of the second embodiment is the same as that of the fuel cell system 100 shown in FIG. 3, it is described using the same reference signs and not described in detail below.

Figure 16A:
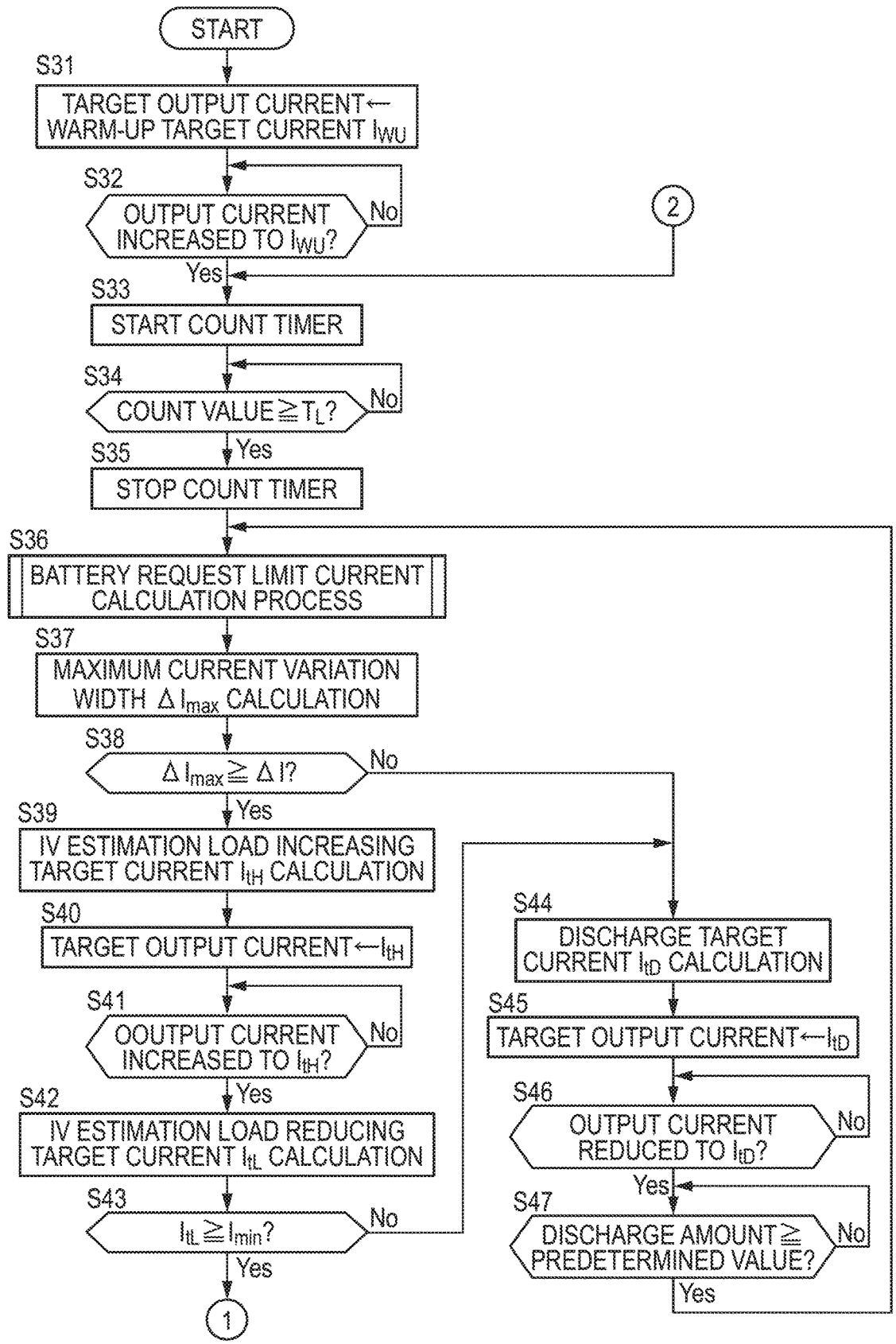
FIG. 16A is a flow chart showing an IV characteristic estimation control according to the second embodiment.
Figure 16B:
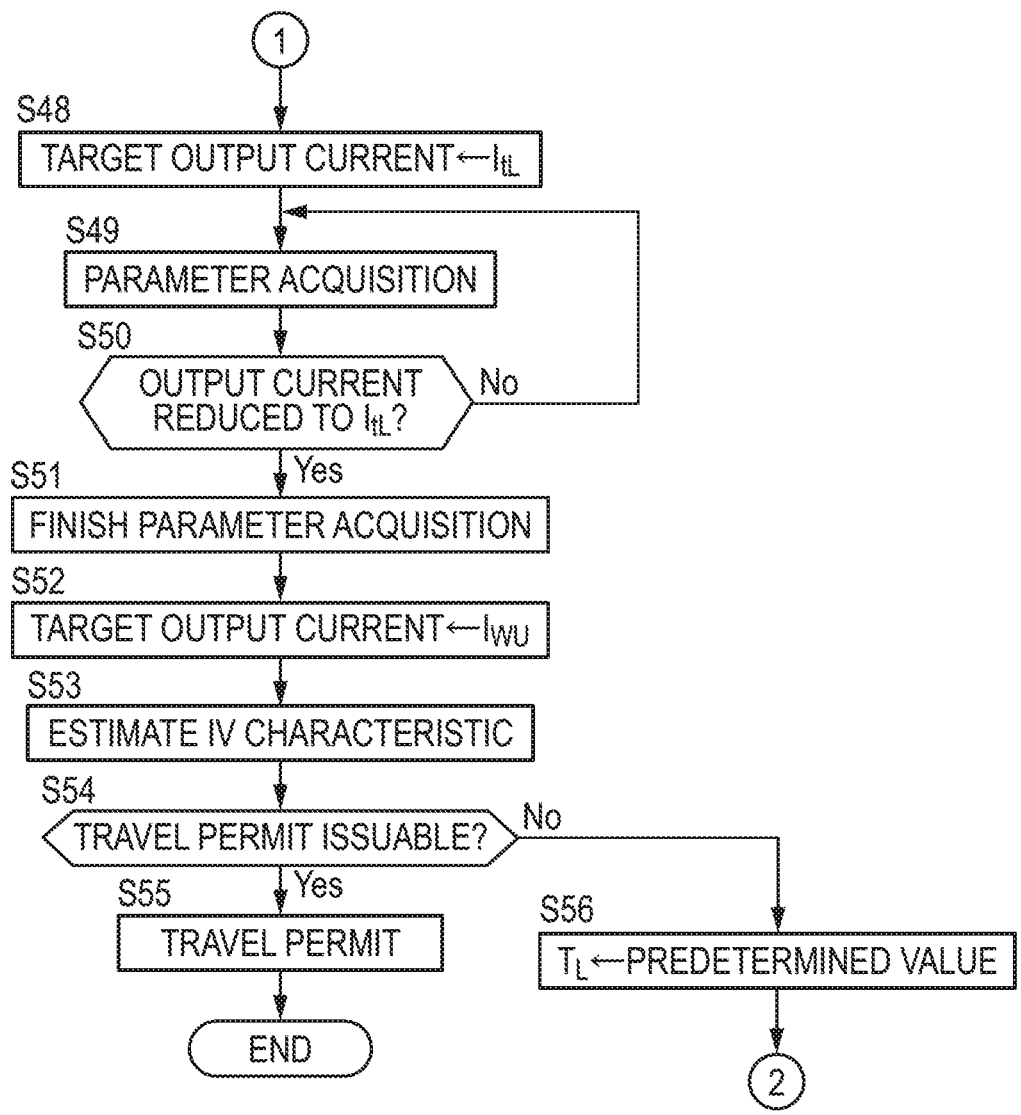
FIG. 16B is a flow chart showing the IV characteristic estimation control according to the second embodiment.

FIGS. 16A and 16B are a flow chart showing an IV characteristic estimation control according to the second embodiment executed during warm-up.

In Step S31, the controller 6 sets a target output current of the fuel cell stack 1 to a predetermined warm-up target current $I_{WU}$ and increases an output current to the warm-up target current $I_{WU}$. The warm-up target current $I_{WU}$ is a value determined according to a consumption current of auxiliary machines that can be driven during warm-up. Thus, the warm-up target current $I_{WU}$ changes according to the consumption current of a cathode compressor 25 and a PTC heater 46 and is normally set at a high value to promote the warm-up of the fuel cell stack 1. However, the warm-up target current $I_{WU}$ is set at a value lower than normal if necessary such as when the consumption current of the cathode compressor of the PTC heater 46 needs to be reduced to prevent the bumping of cooling water.

In Step S32, the controller 6 determines whether or not the output current has increased to the warm-up target current $I_{WU}$. The controller 6 performs a processing of Step S33 if the output current has increased to the warm-up target current $I_{WU}$. On the other hand, unless the output current has increased to the warm-up target current $I_{WU}$, the controller 6 returns to the processing of Step S31 to subsequently increase the output current to the warm-up target current $I_{WU}$.

In Step S33, the controller 6 starts a count timer.

In Step S34, the controller 6 determines whether or not an elapsed time from the start of the count timer (hereinafter, referred to as a "count value") has become equal to or larger than an IV estimation start permit threshold value $T_L$. An initial value of the count value is set at zero. The controller 6 repeats this processing until the count value becomes equal to or larger than the IV estimation start permit threshold value $T_L$.

In Step S35, the controller 6 stops the count timer and resets the count value to zero.

In Step S36, the controller 6 performs a battery request limit current calculation process. This process is a process of calculating an upper limit value (hereinafter, referred to as a "battery request upper limit current $I_{BH}$") and a lower limit value (hereinafter, referred to as a "battery request lower limit current $I_{BL}$") of the output current set according to a state of a battery 55. The detail of the battery request limit current calculation process is described with reference to a flow chart of FIG. 17.

Figure 17:
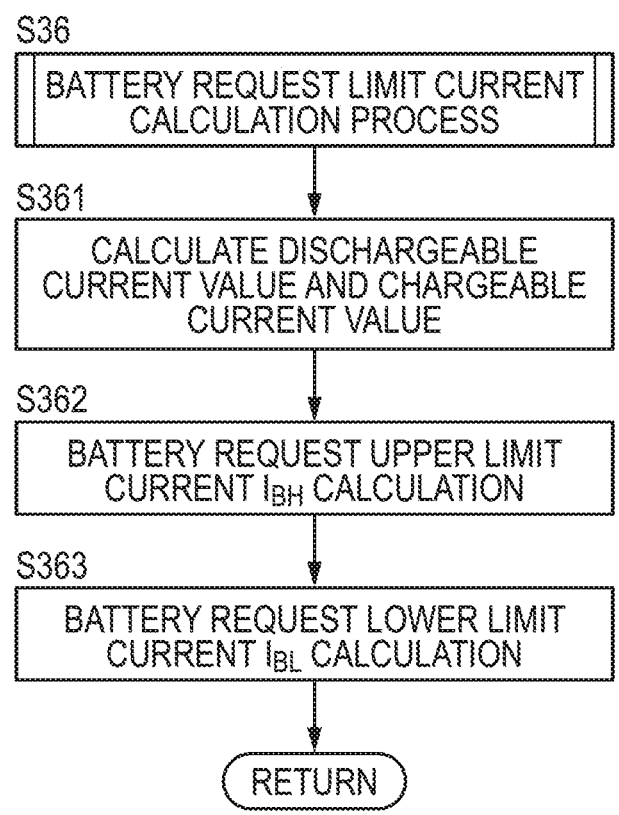
FIG. 17 is a flow chart showing a battery request limit current calculation process.

FIG. 17 is a flow chart showing the battery request limit current calculation process.

In Step S361, the controller 6 calculates a maximum value of the current that can be extracted from the battery 55 (hereinafter, referred to as a "dischargeable current value") and a maximum value of the current that can flow into the battery 55 (hereinafter, referred to as a "chargeable current value") on the basis of a battery charge amount and a battery temperature.

In Step S362, the controller 6 calculates a current value obtained by adding the chargeable current value to the warm-up target current $I_{WU}$ as the battery request upper limit current $I_{BH}$. The battery request upper limit current $I_{BH}$ is such a current value that the battery 55 is overcharged and may be deteriorated if the output current becomes larger than that. This battery request upper limit current $I_{BH}$ corresponds to the aforementioned pre-travel permit upper limit current.

In Step S363, the controller 6 calculates a current value obtained by subtracting the dischargeable current value from the warm-up target current $I_{WU}$ as the battery request lower limit current $I_{BL}$. The battery request lower limit current $I_{BL}$ is such a current value that the battery 55 is over-discharged and may be deteriorated if the output current becomes smaller than that.

The IV characteristic estimation control is described again below, referring back to the flow chart of FIG. 16A.

In Step S37, the controller 6 calculates a maximum current variation width $\Delta I_{max}$. Specifically, the controller 6 calculates a difference value between the battery request upper limit current $I_{BH}$ and the battery request lower limit current $I_{BL}$ as the maximum current variation width $\Delta I_{max}$.

In Step S38, the controller 6 determines whether or not the maximum current variation width $\Delta I_{max}$ is not smaller than a predetermined current variation width $\Delta I$ necessary to ensure the estimation accuracy of the IV characteristic. The controller 6 performs a processing of Step S39 if the maximum current variation width $\Delta I_{max}$ is not smaller than the predetermined current variation width $\Delta I$. On the other hand, a return is made to a processing of Step S44 if the maximum current variation width $\Delta I_{max}$ is below predetermined current variation width $\Delta I$.

In Step S39, the controller 6 calculates an IV estimation load increasing target current $I_{tH}$. Specifically, the controller 6 calculates the smaller one of a current value $I_{bt}$ obtained by adding the current variation width $\Delta I$ to the warm-up target current $I_{WU}$ and the battery request upper limit current $I_{BH}$ as the IV estimation load increasing target current $I_{tH}$. The IV estimation load increasing target current $I_{tH}$ is a target value on an upper side in varying the output current.

In Step S40, the controller 6 sets the target output current of the fuel cell stack 1 to the IV estimation load increasing target current $I_{tH}$ and increases the output current from the warm-up target current $I_{WU}$ toward the IV estimation load increasing target current $I_{tH}$.

In Step S41, the controller 6 determines whether or not the output current has increased to the IV estimation load increasing target current $I_{tH}$. The controller 6 repeats this processing until the output current increases to the IV estimation load increasing target current $I_{tH}$.

In Step S42, the controller 6 calculates an IV estimation load reducing target current $I_{tL}$. Specifically, the controller 6 calculates a current value obtained by subtracting the current variation width $\Delta I$ from the IV estimation load increasing target current $I_{tH}$ as the IV estimation load reducing target current $I_{tL}$. The IV estimation load reducing target current $I_{tL}$ is a target value on a lower side in varying the output current.

In Step S43, the controller 6 determines whether or not the IV estimation load reducing target current $I_{tL}$ is not smaller than the IV estimation accuracy ensuring request lower limit current $I_{min}$. It should be noted that a processing of Step S43 performed by the controller 6 corresponds to judgment unit for judging whether or not a state of power generation of the fuel cell stack 1 is in a good state where the IV characteristic can be estimated during the execution of the IV estimation.

The controller 6 performs a processing of Step S48 if the IV estimation load reducing target current $I_{tL}$ is not smaller than the IV estimation accuracy ensuring request lower limit current $I_{min}$. On the other hand, the controller proceeds to a processing of Step S44 to stop the IV estimation process if the IV estimation load reducing target current $I_{tL}$ is below the IV estimation accuracy ensuring request lower limit current $I_{min}$. Specifically, the controller 6 continues to execute the IV estimation process if the state of power generation of the fuel cell stack 1 is judged to be in a good state while stopping the execution of the IV estimation process unless the state of power generation of the fuel cell stack 1 is judged to be in the good state.

It should be noted that, in the present embodiment, the controller 6 sets a minimum value of the output current determined in advance by an experiment or the like to ensure the estimation accuracy of the IV characteristic, i.e. a fixed value as the IV estimation accuracy ensuring request lower limit current $I_{min}$. However, the controller 6 may change the IV estimation accuracy ensuring request lower limit current $I_{min}$ according to a condition of recovery of the IV characteristic of the fuel cell stack 1, i.e. a progress of the warm-up of the fuel cell stack 1. This is because the IV estimation accuracy ensuring request lower limit current $I_{min}$ tends to decrease as the warm-up of the fuel cell stack 1 progresses and the IV characteristic is recovered.

In the case of changing the IV estimation accuracy ensuring request lower limit current $I_{min}$ according to the progress of the warm-up of the fuel cell stack 1, the controller 6 may, for example, set the IV estimation accuracy ensuring request lower limit current $I_{min}$ at a smaller value as an elapsed time from the start-up of the fuel cell system 100 becomes longer. Alternatively, the controller 6 may set the IV estimation accuracy ensuring request lower limit current $I_{min}$ at a smaller value as the stack temperature increases. As just described, the controller 6 constitutes minimum value setting unit for setting a minimum value of the output current (IV estimation accuracy ensuring request lower limit current $I_{min}$) in changing the output current of the fuel cell stack 1 by the IV estimation process to ensure IV estimation accuracy by the IV estimation process.

In the present embodiment, the smaller one of the current value $I_{bt}$ obtained by adding the current variation width ΔI to the warm-up target current $I_{WU}$ and the battery request upper limit current $I_{BH}$ is calculated as the IV estimation load increasing target current $I_{tH}$. Here, a case where the battery request upper limit current $I_{BH}$ is calculated as the IV estimation load increasing target current $I_{tH}$ is a case where the output current cannot be increased from the warm-up target current $I_{WU}$ to the current value $I_{bt}$ obtained by adding the current variation width ΔI to the warm-up target current $I_{WU}$ and an upper limit of the output current is limited to the battery request upper limit current $I_{BH}$ since the battery charge amount is large and the amount of power receivable by the battery 55 is small.

Thus, if the battery request upper limit current $I_{BH}$ is calculated as the IV estimation load increasing target current $I_{tH}$ when the warm-up target current $I_{WU}$ is lower than normal, for example, to prevent the bumping of the cooling water, the IV estimation load increasing target current $I_{tH}$ may become smaller than the IV estimation accuracy ensuring request lower limit current $I_{min}$. If the IV characteristic is estimated on the basis of the parameters acquired while reducing the output current to the IV estimation load reducing target current $I_{tL}$ when the IV estimation load increasing target current $I_{tH}$ is below the IV estimation accuracy ensuring request lower limit current $I_{min}$, the estimation accuracy of the IV characteristic is deteriorated.

Accordingly, in the present embodiment, the battery request upper limit current $I_{BH}$ is increased by stopping the IV estimation process and discharging the battery 55 as described in the following Steps S44 to S47 in such a case.

In Step S44, the controller 6 calculates a discharge target current $I_{tD}$. The discharge target current $I_{tD}$ is a current value obtained by subtracting a predetermined value set in advance from the warm-up target current $I_{WU}$ and a target value of the output current set to discharge the battery 55.

In Step S45, the controller 6 stops the IV estimation process by setting the target output current of the fuel cell stack 1 to the discharge target current $I_{tD}$ and reduces the output current from the IV estimation load increasing target current $I_{tH}$ to the discharge target current $I_{tD}$. Since this causes the discharge target current $I_{tD}$ to be set to a value smaller than the warm-up target current $I_{WU}$, a shortage of power to drive the auxiliary machines is supplied from the battery 55 and the battery 55 is discharged. As a result, the battery charge amount decreases, wherefore the battery request upper limit current $I_{BH}$ increases. It should be noted that a series of processings of Steps S43 to S45 performed by the controller 6 correspond to IV estimation stop unit that stops the execution of the IV estimation process when the output current of the fuel cell stack 1 is judged to drop below the minimum value (IV estimation accuracy ensuring required lower limit current $I_{min}$) during the execution of the IV estimation process.

In Step S46, the controller 6 determines whether or not the output current has dropped to the discharge target current $I_{tD}$. The controller 6 performs a processing of Step S47 if the output current has been reduced to the discharge target current $I_{tD}$ while repeating this processing until the output current is reduced to the discharge target current $I_{tD}$ unless otherwise.

In Step 47, the controller 6 determines whether or not the charge amount of the battery 55 has become equal to or larger than a predetermined value set in advance. The controller 6 returns to the processing of Step S36 to resume the IV estimation process if the charge amount of the battery 55 has become equal to or larger than the predetermined value. On the other hand, the controller 6 repeats this processing until the charge amount of the battery 55 has become equal to or larger than the predetermined value if it is below the predetermined value.

In Step S48, the controller 6 sets the target output current of the fuel cell stack 1 to the IV estimation load reducing target current $I_{tL}$ and reduces the output current from the IV estimation load increasing target current $I_{tH}$ toward IV estimation load reducing target current $I_{tL}$.

In Step S49, the controller 6 appropriately acquires the aforementioned three parameters (actual output current, reference voltage and actual output voltage) while the output current is being reduced.

In Step S50, the controller 6 determines whether or not the output current has been reduced to the IV estimation load reducing target current $I_{tL}$. The controller 6 performs a processing of Step S51 if the output current has been reduced to the IV estimation load reducing target current $I_{tL}$.

On the other hand, the controller 6 performs a processing of Step S49 if the output current is being reduced to the IV estimation load reducing target current $I_{tL}$.

In Step S51, the controller 6 finishes the acquisition of the parameters.

In Step S52, the controller 6 sets the target output current to the warm-up target current $I_{WU}$ and controls the output current to the warm-up target current $I_{WU}$.

In Step S53, the controller 6 estimates the IV characteristic on the basis of a plurality of acquired parameter groups.

In Step S54, the controller 6 determines whether or not the travel permit is issuable. Specifically, the controller 6 determines whether or not the estimated IV characteristic is a predetermined IV characteristic in which the output voltage of the fuel cell stack 1 does not drop below the system minimum voltage $V_{min}$ even if the travel motor 53 is driven. The controller 6 performs a processing of Step S55 if the travel permit is issuable while performing a processing of Step S56 if it is not issuable.

In Step S55, the controller 6 issues the travel permit and finishes the IV characteristic estimation control.

In Step S56, the controller 6 sets the IV estimation start permit threshold value $T_L$ to a predetermined value set in advance. Then, a return is made to Step S33 to start the count timer and the IV estimation process is resumed when the count value becomes equal to or larger than the predetermined value.

Figure 18:
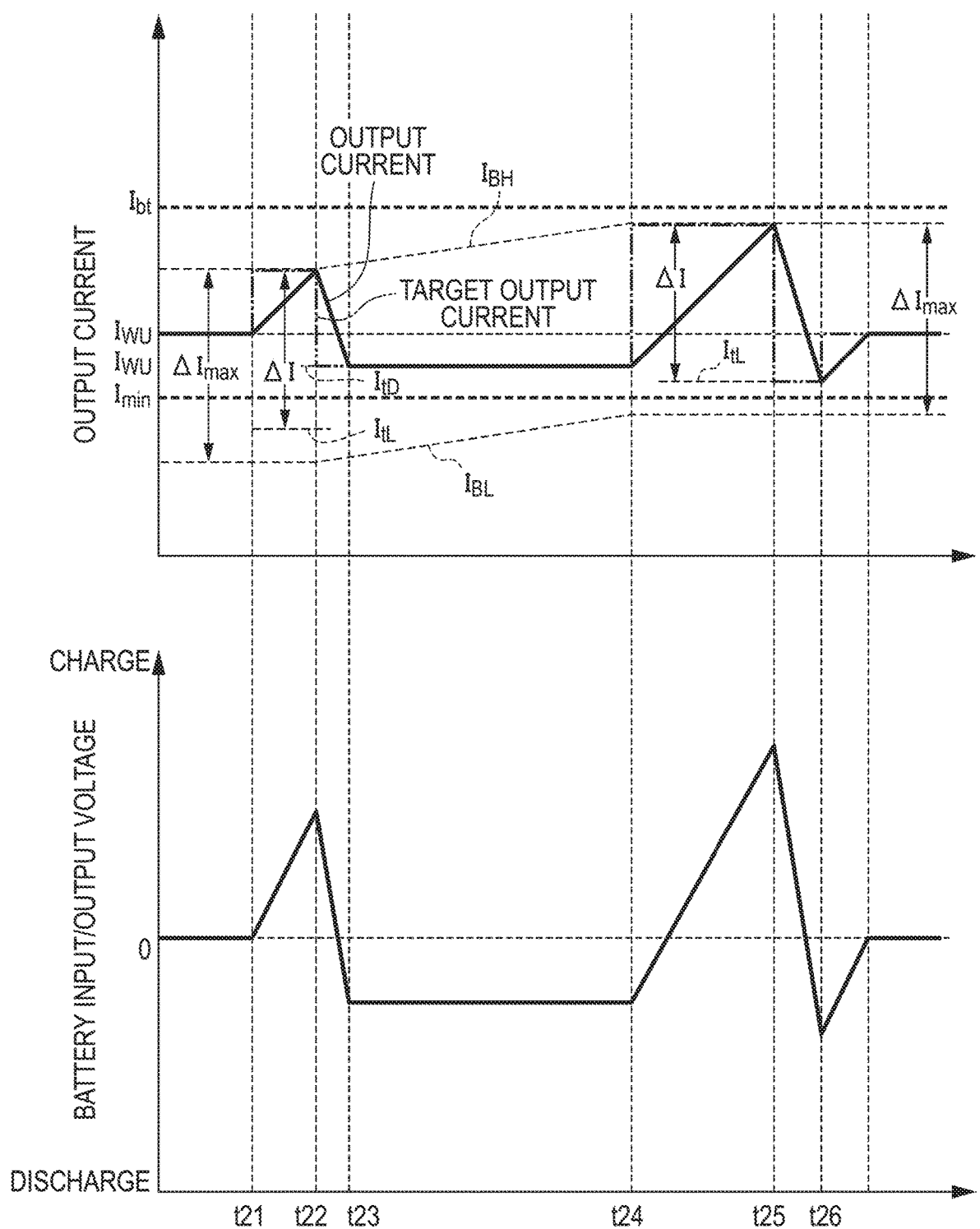
FIG. 18 is a time chart showing an example of the IV characteristic estimation control according to the second embodiment.

FIG. 18 is a time chart showing an example of the operation of the IV characteristic estimation control according to the present embodiment.

Since the output current is controlled to the warm-up target current $I_{WU}$ and the maximum current variation width $\Delta I_{max}$ is not smaller than the current variation width $\Delta I$ at time t21, the controller 6 calculates the IV estimation load increasing target current $I_{tH}$. At time t21, the battery request upper limit current $I_{BH}$ is smaller than the current value $I_{bt}$ obtained by adding the current variation width $\Delta I$ to the warm-up target current $I_{WU}$. Thus, the controller 6 sets the target output current to the battery request upper limit current $I_{BH}$ and increases the output current toward the battery request upper limit current $I_{BH}$.

When the output current is increased to the battery request upper limit current $I_{BH}$ at time t22, the controller 6 calculates the IV estimation load reducing target current $I_{tL}$. At time t22, the IV estimation load reducing target current $I_{tL}$ is smaller than the IV estimation accuracy ensuring request lower limit current $I_{min}$. Thus, the controller 6 sets the target output current to the discharge target current $I_{tD}$ and reduces the output current toward the discharge target current $I_{tD}$.

When the output current is reduced to the discharge target current $I_{tD}$ at time t23, the controller 6 controls the output current to the discharge target current $I_{tD}$ until a discharge amount reaches a predetermined value. In this way, the battery 55 is discharged and the battery request upper limit current $I_{BH}$ increases.

When the discharge amount reaches the predetermined value at time t24, the controller 6 determines again whether the maximum current variation width $\Delta I_{max}$ is not smaller than the current variation width $\Delta I$. Since the maximum current variation width $\Delta I_{max}$ is not smaller than the current variation width $\Delta I$ at time t24, the controller 6 calculates the IV estimation load increasing target current $I_{tH}$. Since the battery request upper limit current $I_{BH}$ is smaller than the current value $I_{bt}$ obtained by adding the current variation width $\Delta I$ to the warm-up target current $I_{WU}$ also at time t24, the controller 6 sets the target current to the battery request upper limit current $I_{BH}$. Then, the controller 6 increases the output current toward the battery request upper limit current $I_{BH}$ again.

When the output current increases to the battery request upper limit current $I_{BH}$ at time t25, the controller 6 calculates the IV estimation load reducing target current $I_{tL}$. At time t25, the IV estimation load reducing target current $I_{tL}$ is larger than the IV estimation accuracy ensuring request lower limit current $I_{min}$ since the battery 55 is discharged. Thus, the controller 6 sets the target current to the IV estimation load reducing target current $I_{tL}$ and reduces the output current toward the IV estimation load reducing target current $I_{tL}$. Then, the controller 6 appropriately acquires the aforementioned three parameters (actual output current, reference voltage and actual output voltage) while the output current is being reduced.

When the output current is reduced to the IV estimation load reducing target current $I_{tL}$ at time t26, the acquisition of the parameters is finished and the target output current is set to the warm-up target current $I_{WU}$. Then, the controller 6 estimates the IV characteristic on the basis of the acquired parameters and determines whether or not the travel permit is issuable.

The controller finishes the IV characteristic estimation control when determining that the travel permit is issuable. On the other hand, when it is determined that the travel permit is not issuable, the IV estimation start permit threshold value $T_L$ is set to the predetermined value and the count timer is started. When an elapsed time from time t26 becomes equal to or larger than the predetermined value, the IV estimation process is resumed.

The fuel cell system 100 according to the present embodiment as described above includes the fuel cell stack 1 and the loads such as the auxiliary machines connected to the fuel cell stack 1 and the battery 55, and executes the IV estimation process that changes the output current of the fuel cell stack 1 with the predetermined width by adjusting power supplied to the loads during the warm-up of the fuel cell stack 1, and estimating the IV characteristic of the fuel cell stack 1 on the basis of at least two sets of the output current value and the output voltage value detected while the output current is changed.

Then, the fuel cell system 100 stops the execution of the IV estimation on the basis of an output of the fuel cell stack 1. For example, the fuel cell system 100 determines whether or not the state of power generation of the fuel cell stack 1, i.e. the operating state of the fuel cell system 100 is in the good state suitable for the execution of the IV estimation process and stops the execution of the IV estimation if the operating state of the fuel cell system 100 is determined not to be in the good state. Specifically, the fuel cell system 100 stops the execution of the IV estimation only in a state where the variation width of the output current necessary to ensure the estimation accuracy of the IV characteristic cannot be ensued due to the operating states of the auxiliary machines. This can avoid the deterioration of the estimation accuracy of the IV characteristic due to a change of the output current of the fuel cell stack 1.

Further, the fuel cell system according to the present embodiment sets the minimum value of the output current (IV estimation accuracy ensuring request lower limit current $I_{min}$) in changing the output current by the IV estimation process and stops the execution of the IV estimation when judging that the output current drops below the minimum value during the execution of the IV estimation.

Since this can suppress the estimation of the IV characteristic of the fuel cell stack 1 on the basis of the output current values and the output voltage values detected in an area where the output current is lower than the minimum value, the deterioration of the IV estimation accuracy can be suppressed.

At this time, if the minimum value is set to become smaller as the warm-up of the fuel cell stack 1 progresses, it is possible to set the minimum value corresponding to the progress of the warm-up. This can reduce a frequency of stopping the execution of the IV estimation due to a drop of the output current during the execution of the IV estimation when the warm-up of the fuel cell stack 1 is in progress. As a result, an estimation frequency of the IV characteristic is increased, wherefore whether or not the travel permit is issuable can be determined quickly.

Further, the fuel cell system 100 according to the present embodiment executes the IV estimation again after the battery 55 as the load is discharged when the execution of the IV estimation is stopped.

This can increase the value of the current that can flow into the battery 55 (chargeable current) by reducing the charge amount of the battery 55. Thus, in changing the output current with the predetermined width by the IV estimation process again, the output current can be increased to a higher current value by as much as an increase of the chargeable current. Thus, when the output current is reduced to change the output current with the predetermined width by the IV estimation process again, it can be suppressed that the output current drops below the minimum value again and that the IV estimation is uselessly repeated.

Further, the fuel cell system 100 according to the present embodiment warms up the fuel cell stack 1 by adjusting the power supplied to the loads such that the output current reaches the predetermined warm-up target current $I_{WU}$ during the warm-up of the fuel cell stack 1.

Then, after increasing the output current from the warm-up target current $I_{WU}$, the IV estimation process adjusts the power supplied to the loads such that the output current is reduced by the predetermined width and estimates the IV characteristic of the fuel cell stack 1 on the basis of at least two sets of the output current value and the output voltage value detected while the output current is reduced.

By reducing the output current after increasing the output current from the warm-up target current $I_{WU}$ set to promote the warm-up in this way, a frequency that the output current drops below the warm-up target current $I_{WU}$ during the execution of the IV estimation can be reduced. Thus, the deterioration of warm-up performance when the output current is changed by the IV estimation process can be suppressed.

Although the first and second embodiments of the present invention have been described above, the above embodiments are merely an illustration of some application examples of the present invention and not intended to limit the technical scope of the present invention to the specific configurations of the above embodiments.

For example, although the battery 55 is discharged until the discharge amount becomes equal to or larger than the predetermined value in Step S47 in the second embodiment, the battery request upper limit current $I_{BH}$ may be calculated during discharge and the battery 55 may be discharged until the battery request upper limit current $I_{BH}$ becomes equal to or larger than a predetermined value.

Further, the buffer tank 36 is provided as a space for storing the anode off-gas in the above embodiments. However, without providing such a buffer tank 36, an internal manifold of the fuel cell stack 1 may be, for example, used as a space alternative to the buffer tank 36. The internal manifold mentioned here is an internal space of the fuel cell stack 1 where the anode off-gas having flowed in the anode gas flow passages 121 is collected and the anode off-gas is discharged to the anode gas discharge passage 35 via the manifold.

It should be noted that the above embodiments can be appropriately combined.

The present application claims the benefit of priority from Japanese Patent Application No. 2014-27808, filed in the Japan Patent Office on Feb. 27, 2014 and Japanese Patent Application No. 2014-27809, filed in the Japan Patent Office on Feb. 27, 2014, these disclosure of which is incorporated herein by reference in its entirety.

The invention claimed is:

1. A fuel cell system for generating power by supplying anode gas and cathode gas to a fuel cell, comprising:
   a load connected to the fuel cell; and
   a controller programmed to
      change an output current of the fuel cell with a predetermined width by adjusting power supplied to the load connected to the fuel cell during a warm-up of the fuel cell so as to estimate an IV characteristic of the fuel cell;
      estimate the IV characteristic of the fuel cell on the basis of at least two sets of an output current value and an output voltage value that are respectively detected by a current sensor and a voltage sensor while the output current is changed;
      set a minimum value of the output current in changing the output current value of the fuel cell by the controller to ensure IV estimation accuracy by the controller;
      decrease the minimum value as the warm-up of the fuel cell progresses;
      stop changing the output current of the fuel cell with a predetermined width so as to estimate the IV characteristic, if a value of the output current of the fuel cell drops below the minimum value during an execution of the IV estimation, and set the output current of the fuel cell to a target current for warming up the fuel cell so as to control the output current of the fuel cell to be the target current for warming up the fuel cell; and
      change an output current of the fuel cell with the predetermined width so as to execute again the IV estimation if a value of the output current of the fuel cell is equal to or larger than the minimum value.

2. The fuel cell system according to claim 1, wherein the controller is further configured to stop the fuel cell system when the detected value of the output voltage value of the fuel cell drops to or below a predetermined value.

3. The fuel cell system according to claim 1, wherein the controller is further configured to estimate the IV characteristic of the fuel cell on the basis of at least two sets of the output current value and the output voltage value detected while the output current is reduced.

* * * * *